United States Patent
Sheng et al.

(10) Patent No.: US 10,048,811 B2
(45) Date of Patent: Aug. 14, 2018

(54) DETECTING TOUCH INPUT PROVIDED BY SIGNAL TRANSMITTING STYLUS

(71) Applicant: Sentons Inc., San Jose, CA (US)

(72) Inventors: Samuel W. Sheng, Saratoga, CA (US); Shih-Ming Shih, San Jose, CA (US); Yenyu Hsieh, San Jose, CA (US); Mark Hamblin, San Francisco, CA (US); Lapoe E. Lynn, Los Altos, CA (US)

(73) Assignee: Sentons Inc. (KY)

( * ) Notice: Subject to any disclaimer, the term of this patent is extended or adjusted under 35 U.S.C. 154(b) by 0 days.

(21) Appl. No.: 15/267,661

(22) Filed: Sep. 16, 2016

(65) Prior Publication Data

US 2017/0083164 A1 Mar. 23, 2017

Related U.S. Application Data

(60) Provisional application No. 62/220,864, filed on Sep. 18, 2015.

(51) Int. Cl.
*G06F 3/043* (2006.01)
*G06F 3/0354* (2013.01)
(Continued)

(52) U.S. Cl.
CPC ........ *G06F 3/0433* (2013.01); *G06F 3/03545* (2013.01); *G06F 3/0436* (2013.01);
(Continued)

(58) Field of Classification Search
CPC .. G06F 3/0433; G06F 3/03545; G06F 3/0436; G06F 3/04883; G06F 2203/04104; G06F 2203/04105; H04J 13/0062
See application file for complete search history.

(56) References Cited

U.S. PATENT DOCUMENTS 4,488,000 A 12/1984 Glenn
4,594,695 A 6/1986 Garconnat
(Continued)

FOREIGN PATENT DOCUMENTS

CN 101373415 B 2/2009
CN 101669088 B 3/2010
(Continued)

OTHER PUBLICATIONS

Liu et al., 'Acoustic Wave Approach for Multi-Touch Tactile Sensing', Micro-NanoMechatronics and Human Science, 2009. MHS 2009. International Symposium, Nov. 9-11, 2009.
(Continued)

*Primary Examiner* — Tom Sheng
(74) *Attorney, Agent, or Firm* — Van Pelt, Yi & James LLP

(57) ABSTRACT

A touch input provided by a touch input indicator device is received on a propagating medium of a receiving device. The touch input indicator device includes a transmitter that transmits a signal to the propagating medium when the touch input indicator device contacts the propagating medium. The signal encodes a digital binary data identifying the signal. The signal that has been propagated through the propagating medium is received at a receiver of the receiving device. The receiver is coupled to the propagating medium. The digital binary data is detected in the received signal. Based at least in part on the detection of the digital binary data, the touch input provided by the touch input indicator device is detected.

20 Claims, 15 Drawing Sheets

(51) Int. Cl.
*H04J 13/00* (2011.01)
*G06F 3/0488* (2013.01)

(52) U.S. Cl.
CPC ...... *G06F 3/04883* (2013.01); *H04J 13/0062* (2013.01); *G06F 2203/04104* (2013.01); *G06F 2203/04105* (2013.01)

(56) References Cited

U.S. PATENT DOCUMENTS

| | | | |
|---|---|---|---|
| 5,091,406 A | 2/1992 | Toda | |
| 5,334,805 A | 8/1994 | Knowles | |
| 5,451,723 A | 9/1995 | Huang | |
| 5,563,849 A | 10/1996 | Hall | |
| 5,573,077 A | 11/1996 | Knowles | |
| 5,635,643 A | 6/1997 | Maji | |
| 5,637,839 A | 6/1997 | Yamaguchi | |
| 5,708,460 A | 1/1998 | Young | |
| 5,739,479 A | 4/1998 | Davis-Cannon | |
| 5,784,054 A | 7/1998 | Armstrong | |
| 5,883,457 A | 3/1999 | Rinde | |
| 5,912,659 A | 6/1999 | Rutledge | |
| 6,091,406 A | 7/2000 | Kambara | |
| 6,232,960 B1 | 5/2001 | Goldman | |
| 6,236,391 B1 * | 5/2001 | Kent | G06F 3/0436 178/18.04 |
| 6,254,105 B1 | 7/2001 | Rinde | |
| 6,262,946 B1 | 7/2001 | Khuri-Yakub | |
| 6,307,942 B1 | 10/2001 | Azima | |
| 6,473,075 B1 | 10/2002 | Gomes | |
| 6,492,979 B1 | 12/2002 | Kent | |
| 6,498,603 B1 | 12/2002 | Wallace | |
| 6,535,147 B1 | 3/2003 | Masters | |
| 6,567,077 B2 | 5/2003 | Inoue | |
| 6,630,929 B1 | 10/2003 | Adler | |
| 6,633,280 B1 | 10/2003 | Matsumoto | |
| 6,636,201 B1 | 10/2003 | Gomes | |
| 6,788,296 B2 | 9/2004 | Ikeda | |
| 6,798,403 B2 | 9/2004 | Kitada | |
| 6,856,259 B1 | 2/2005 | Sharp | |
| 6,891,527 B1 | 5/2005 | Chapman | |
| 6,922,642 B2 | 7/2005 | Sullivan | |
| 6,948,371 B2 | 9/2005 | Tanaka | |
| 7,000,474 B2 | 2/2006 | Kent | |
| 7,006,081 B2 | 2/2006 | Kent | |
| 7,116,315 B2 | 10/2006 | Sharp | |
| 7,119,800 B2 | 10/2006 | Kent | |
| 7,187,369 B1 | 3/2007 | Kanbara | |
| 7,193,617 B1 | 3/2007 | Kanbara | |
| 7,204,148 B2 | 4/2007 | Tanaka | |
| 7,218,248 B2 | 5/2007 | Kong | |
| 7,274,358 B2 | 9/2007 | Kent | |
| RE39,881 E | 10/2007 | Flowers | |
| 7,315,336 B2 | 1/2008 | North | |
| 7,345,677 B2 | 3/2008 | Ing | |
| 7,411,581 B2 | 8/2008 | Hardie-Bick | |
| 7,456,825 B2 | 11/2008 | Kent | |
| 7,511,711 B2 | 3/2009 | Ing | |
| 7,545,365 B2 | 6/2009 | Kent | |
| 7,554,246 B2 | 6/2009 | Maruyama | |
| 7,583,255 B2 | 9/2009 | Ing | |
| 7,649,807 B2 | 1/2010 | Ing | |
| 7,683,894 B2 | 3/2010 | Kent | |
| 7,880,721 B2 | 2/2011 | Suzuki | |
| 7,920,133 B2 | 4/2011 | Tsumura | |
| 8,059,107 B2 | 11/2011 | Hill | |
| 8,085,124 B2 | 12/2011 | Ing | |
| 8,194,051 B2 | 6/2012 | Wu | |
| 8,228,121 B2 | 7/2012 | Benhamouda | |
| 8,237,676 B2 | 8/2012 | Duheille | |
| 8,319,752 B2 | 11/2012 | Hardie-Bick | |
| 8,325,159 B2 | 12/2012 | Kent | |
| 8,358,277 B2 | 1/2013 | Mosby | |
| 8,378,974 B2 | 2/2013 | Aroyan | |
| 8,392,486 B2 | 3/2013 | Ing | |
| 8,427,423 B2 | 4/2013 | Tsumura | |
| 8,436,806 B2 | 5/2013 | Almalki | |
| 8,436,808 B2 | 5/2013 | Chapman | |
| 8,493,332 B2 | 7/2013 | D'Souza | |
| 8,576,202 B2 | 11/2013 | Tanaka | |
| 8,619,063 B2 | 12/2013 | Chaine | |
| 8,638,318 B2 | 1/2014 | Gao | |
| 8,648,815 B2 | 2/2014 | Kent | |
| 8,659,579 B2 | 2/2014 | Nadjar | |
| 8,670,290 B2 | 3/2014 | Aklil | |
| 8,681,128 B2 | 3/2014 | Scharff | |
| 8,692,809 B2 | 4/2014 | D'Souza | |
| 8,692,810 B2 | 4/2014 | Ing | |
| 8,692,812 B2 | 4/2014 | Hecht | |
| 8,730,213 B2 | 5/2014 | D'Souza | |
| 8,749,517 B2 | 6/2014 | Aklil | |
| 8,787,599 B2 | 7/2014 | Grattan | |
| 8,823,685 B2 | 9/2014 | Scharff | |
| 8,854,339 B2 | 10/2014 | Kent | |
| 8,890,852 B2 | 11/2014 | Aroyan | |
| 8,896,429 B2 | 11/2014 | Chaine | |
| 8,896,564 B2 | 11/2014 | Scharff | |
| 8,917,249 B1 | 12/2014 | Buuck | |
| 8,941,624 B2 | 1/2015 | Kent | |
| 8,946,973 B2 | 2/2015 | Pelletier | |
| 8,994,696 B2 | 3/2015 | Berget | |
| 9,030,436 B2 | 5/2015 | Ikeda | |
| 9,046,959 B2 | 6/2015 | Schevin | |
| 9,046,966 B2 | 6/2015 | D'Souza | |
| 9,058,071 B2 | 6/2015 | Esteve | |
| 9,099,971 B2 | 8/2015 | Lynn | |
| 9,189,109 B2 | 11/2015 | Sheng | |
| 9,348,468 B2 | 5/2016 | Altekar | |
| 9,594,450 B2 | 3/2017 | Lynn | |
| 2001/0050677 A1 | 12/2001 | Tosaya | |
| 2002/0047833 A1 | 4/2002 | Kitada | |
| 2002/0185981 A1 | 12/2002 | Dietz | |
| 2003/0161484 A1 | 8/2003 | Kanamori | |
| 2003/0189745 A1 | 10/2003 | Kikuchi | |
| 2003/0197691 A1 | 10/2003 | Fujiwara | |
| 2003/0206162 A1 | 11/2003 | Roberts | |
| 2004/0133366 A1 | 7/2004 | Sullivan | |
| 2004/0160421 A1 | 8/2004 | Sullivan | |
| 2004/0183788 A1 | 9/2004 | Kurashima | |
| 2004/0203594 A1 | 10/2004 | Kotzin | |
| 2004/0239649 A1 | 12/2004 | Ludtke | |
| 2004/0246239 A1 | 12/2004 | Knowles | |
| 2005/0063553 A1 | 3/2005 | Ozawa | |
| 2005/0146511 A1 | 7/2005 | Hill | |
| 2005/0146512 A1 | 7/2005 | Hill | |
| 2005/0174338 A1 | 8/2005 | Ing | |
| 2005/0226455 A1 | 10/2005 | Aubauer | |
| 2006/0071912 A1 | 4/2006 | Hill | |
| 2006/0109261 A1 | 5/2006 | Chou | |
| 2006/0114233 A1 | 6/2006 | Radivojevic | |
| 2006/0139339 A1 | 6/2006 | Pechman | |
| 2006/0139340 A1 | 6/2006 | Geaghan | |
| 2006/0152499 A1 | 7/2006 | Roberts | |
| 2006/0166681 A1 | 7/2006 | Lohbihler | |
| 2006/0197753 A1 | 9/2006 | Hotelling | |
| 2006/0262104 A1 | 11/2006 | Sullivan | |
| 2006/0279548 A1 | 12/2006 | Geaghan | |
| 2006/0284841 A1 | 12/2006 | Hong | |
| 2007/0019825 A1 | 1/2007 | Marumoto | |
| 2007/0109274 A1 | 5/2007 | Reynolds | |
| 2007/0165009 A1 | 7/2007 | Sakurai | |
| 2007/0171212 A1 | 7/2007 | Sakurai | |
| 2007/0183520 A1 | 8/2007 | Kim et al. | |
| 2007/0211022 A1 | 9/2007 | Boillot | |
| 2007/0214462 A1 | 9/2007 | Boillot | |
| 2007/0229479 A1 | 10/2007 | Choo | |
| 2007/0279398 A1 | 12/2007 | Tsumura | |
| 2008/0018618 A1 | 1/2008 | Hill | |
| 2008/0030479 A1 | 2/2008 | Lowles | |
| 2008/0062151 A1 | 3/2008 | Kent | |
| 2008/0081671 A1 | 4/2008 | Wang | |
| 2008/0105470 A1 | 5/2008 | Van De Ven | |
| 2008/0111788 A1 | 5/2008 | Rosenberg | |
| 2008/0169132 A1 | 7/2008 | Ding | |
| 2008/0174565 A1 | 7/2008 | Chang | |

(56) References Cited

U.S. PATENT DOCUMENTS

| | | |
|---|---|---|
| 2008/0198145 A1 | 8/2008 | Knowles |
| 2008/0231612 A1 | 9/2008 | Hill |
| 2008/0259030 A1 | 10/2008 | Holtzman |
| 2008/0266266 A1 | 10/2008 | Kent |
| 2008/0284755 A1 | 11/2008 | Hardie-Bick |
| 2009/0009488 A1 | 1/2009 | D'Souza |
| 2009/0103853 A1 | 4/2009 | Daniel |
| 2009/0116661 A1 | 5/2009 | Hetherington |
| 2009/0146533 A1 | 6/2009 | Leskinen |
| 2009/0160728 A1 | 6/2009 | Emrick |
| 2009/0167704 A1 | 7/2009 | Terlizzi |
| 2009/0237372 A1 | 9/2009 | Kim |
| 2009/0271004 A1 | 10/2009 | Zecchin |
| 2009/0273583 A1 | 11/2009 | Norhammar |
| 2009/0309853 A1 | 12/2009 | Hildebrandt |
| 2009/0315848 A1 | 12/2009 | Ku |
| 2010/0026667 A1 | 2/2010 | Bernstein |
| 2010/0027810 A1 | 2/2010 | Marton |
| 2010/0044121 A1 | 2/2010 | Simon |
| 2010/0045635 A1 | 2/2010 | Soo |
| 2010/0079264 A1 | 4/2010 | Hoellwarth |
| 2010/0117933 A1 | 5/2010 | Gothard |
| 2010/0117993 A1 | 5/2010 | Kent |
| 2010/0141408 A1 | 6/2010 | Doy |
| 2010/0156818 A1 | 6/2010 | Burrough |
| 2010/0165215 A1 | 7/2010 | Shim |
| 2010/0185989 A1 | 7/2010 | Shiplacoff |
| 2010/0188356 A1 | 7/2010 | Vu |
| 2010/0245265 A1 | 9/2010 | Sato |
| 2010/0269040 A1 | 10/2010 | Lee |
| 2010/0277431 A1 | 11/2010 | Klinghult |
| 2010/0309139 A1 | 12/2010 | Ng |
| 2010/0315373 A1 | 12/2010 | Steinhauser |
| 2010/0321312 A1 | 12/2010 | Han |
| 2010/0321325 A1 | 12/2010 | Springer |
| 2010/0321337 A1 | 12/2010 | Liao |
| 2011/0001707 A1 | 1/2011 | Faubert |
| 2011/0001708 A1 | 1/2011 | Sleeman |
| 2011/0012717 A1 | 1/2011 | Pance |
| 2011/0018695 A1 | 1/2011 | Bells |
| 2011/0025649 A1 | 2/2011 | Sheikhzadeh Nadjar |
| 2011/0042152 A1 | 2/2011 | Wu |
| 2011/0057903 A1 | 3/2011 | Yamano |
| 2011/0063228 A1 | 3/2011 | St Pierre |
| 2011/0080350 A1 | 4/2011 | Almalki |
| 2011/0084912 A1 | 4/2011 | Almalki |
| 2011/0084937 A1 | 4/2011 | Chang |
| 2011/0155479 A1* | 6/2011 | Oda ................ G06F 3/03545 178/18.06 |
| 2011/0156967 A1 | 6/2011 | Oh |
| 2011/0167391 A1 | 7/2011 | Momeyer |
| 2011/0175813 A1 | 7/2011 | Sarwar |
| 2011/0182443 A1 | 7/2011 | Gant |
| 2011/0191680 A1 | 8/2011 | Chae |
| 2011/0199342 A1 | 8/2011 | Vartanian |
| 2011/0213223 A1 | 9/2011 | Kruglick |
| 2011/0222372 A1 | 9/2011 | O'Donovan |
| 2011/0234545 A1 | 9/2011 | Tanaka |
| 2011/0260990 A1 | 10/2011 | Ali |
| 2011/0279382 A1 | 11/2011 | Pertuit |
| 2011/0298670 A1 | 12/2011 | Jung |
| 2011/0300845 A1 | 12/2011 | Lee |
| 2011/0304577 A1* | 12/2011 | Brown ................ G06F 3/03545 345/174 |
| 2011/0316784 A1 | 12/2011 | Bisutti |
| 2011/0316790 A1 | 12/2011 | Ollila |
| 2012/0001875 A1 | 1/2012 | Li |
| 2012/0002820 A1 | 1/2012 | Leichter |
| 2012/0007837 A1 | 1/2012 | Kent |
| 2012/0026114 A1 | 2/2012 | Lee |
| 2012/0032928 A1 | 2/2012 | Alberth |
| 2012/0050230 A1 | 3/2012 | Harris |
| 2012/0062564 A1 | 3/2012 | Miyashita |
| 2012/0068939 A1 | 3/2012 | Pemberton-Pigott |
| 2012/0068970 A1 | 3/2012 | Pemberton-Pigott |
| 2012/0081337 A1 | 4/2012 | Camp, Jr. |
| 2012/0088548 A1 | 4/2012 | Yun |
| 2012/0120031 A1 | 5/2012 | Thuillier |
| 2012/0126962 A1 | 5/2012 | Ujii |
| 2012/0127088 A1 | 5/2012 | Pance |
| 2012/0140954 A1 | 6/2012 | Ranta |
| 2012/0149437 A1 | 6/2012 | Zurek |
| 2012/0188194 A1 | 7/2012 | Sulem |
| 2012/0188889 A1 | 7/2012 | Sambhwani |
| 2012/0194466 A1 | 8/2012 | Posamentier |
| 2012/0200517 A1 | 8/2012 | Nikolovski |
| 2012/0206154 A1 | 8/2012 | Pant |
| 2012/0229407 A1 | 9/2012 | Harris |
| 2012/0232834 A1 | 9/2012 | Roche |
| 2012/0242603 A1* | 9/2012 | Engelhardt ......... G06F 3/03545 345/173 |
| 2012/0272089 A1 | 10/2012 | Hatfield |
| 2012/0278490 A1 | 11/2012 | Sennett |
| 2012/0282944 A1 | 11/2012 | Zhao |
| 2012/0300956 A1 | 11/2012 | Horii |
| 2012/0306823 A1 | 12/2012 | Pance |
| 2013/0011144 A1 | 1/2013 | Amiri Farahani |
| 2013/0050154 A1* | 2/2013 | Guy ...................... G06F 3/0416 345/179 |
| 2013/0057491 A1* | 3/2013 | Chu ..................... G06F 3/0416 345/173 |
| 2013/0059532 A1 | 3/2013 | Mahanfar |
| 2013/0082970 A1 | 4/2013 | Frey |
| 2013/0127755 A1 | 5/2013 | Lynn |
| 2013/0141365 A1 | 6/2013 | Lynn |
| 2013/0147768 A1 | 6/2013 | Aroyan |
| 2013/0222274 A1 | 8/2013 | Mori |
| 2013/0234995 A1 | 9/2013 | Son |
| 2013/0249831 A1 | 9/2013 | Harris |
| 2014/0028576 A1* | 1/2014 | Shahparnia ........... G06F 3/0416 345/173 |
| 2014/0078070 A1* | 3/2014 | Armstrong-Muntner ............................... G06F 3/044 345/173 |
| 2014/0078109 A1* | 3/2014 | Armstrong-Muntner ......................... G06F 3/03545 345/175 |
| 2014/0185834 A1 | 7/2014 | Frömel |
| 2014/0247250 A1 | 9/2014 | Sheng |
| 2014/0362055 A1* | 12/2014 | Altekar ................ G06F 3/0436 345/177 |
| 2014/0368464 A1 | 12/2014 | Singnurkar |
| 2015/0002415 A1* | 1/2015 | Lee .................... G06F 3/03545 345/173 |
| 2015/0109239 A1 | 4/2015 | Mao |
| 2015/0199035 A1* | 7/2015 | Chang ................. G06F 3/03545 345/179 |
| 2015/0253895 A1* | 9/2015 | Kim ...................... G06F 3/044 345/174 |
| 2016/0162044 A1* | 6/2016 | Ciou ..................... G06F 3/0383 345/179 |
| 2016/0179249 A1* | 6/2016 | Ballan .................. G06F 3/0416 345/174 |
| 2016/0209944 A1* | 7/2016 | Shim .................. G06F 3/03545 |
| 2016/0282965 A1* | 9/2016 | Jensen ............... G06F 3/03545 |
| 2016/0349922 A1 | 12/2016 | Choi |
| 2017/0010697 A1* | 1/2017 | Jiang ..................... G06F 3/033 |

FOREIGN PATENT DOCUMENTS

| | | |
|---|---|---|
| EP | 2315101 A1 | 4/2011 |
| EP | 2315101 B1 | 1/2014 |
| FR | 2948787 B1 | 2/2011 |
| KR | 20040017272 | 2/2004 |
| KR | 20070005580 | 1/2007 |
| KR | 20080005990 | 1/2008 |
| KR | 20110001839 | 1/2011 |
| WO | WO-03005292 A1 | 1/2003 |
| WO | WO-2006115947 A3 | 6/2007 |
| WO | WO-2011010037 A1 | 1/2011 |
| WO | WO-2011024434 | 3/2011 |
| WO | WO-2011048433 A1 | 4/2011 |
| WO | WO-2011051722 | 5/2011 |

(56) References Cited

FOREIGN PATENT DOCUMENTS

| WO | WO-2012010912 A2 | 1/2012 |
| WO | WO-2014209757 A1 | 12/2014 |
| WO | 2015027017 | 2/2015 |

OTHER PUBLICATIONS

T Benedict et al. 'The joint estimation of signal and noise from the sum envelope.' IEEE Transactions on Information Theory 13.3, pp. 447-454. Jul. 1, 1967.

* cited by examiner

DETECTING TOUCH INPUT PROVIDED BY SIGNAL TRANSMITTING STYLUS

CROSS REFERENCE TO OTHER APPLICATIONS

This application claims priority to U.S. Provisional Patent Application No. 62/220,864 entitled ACOUSTIC ACTIVE STYLUS filed Sep. 18, 2015 which is incorporated herein by reference for all purposes.

BACKGROUND OF THE INVENTION

Various technologies have been used to detect a touch input on a display area. The most popular technologies today include capacitive and resistive touch detection technology. Using resistive touch technology, often a glass panel is coated with multiple conductive layers that register touches when physical pressure is applied to the layers to force the layers to make physical contact. Using capacitive touch technology, often a glass panel is coated with material that can hold an electrical charge sensitive to a human finger. By detecting the change in the electrical charge due to a touch, a touch location can be detected. However, with resistive and capacitive touch detection technologies, the glass screen is required to be coated with a material that reduces the clarity of the glass screen. Additionally, because the entire glass screen is required to be coated with a material, manufacturing and component costs can become prohibitively expensive as larger screens are desired.

Another type of touch detection technology includes bending wave technology. One example includes the ELO Touch Systems Acoustic Pulse Recognition, commonly called APR, manufactured by ELO Touch Systems of Menlo Park, Calif. The APR system includes transducers attached to the edges of a touchscreen glass that pick up the sound emitted on the glass due to a touch. However, the surface glass may pick up other external sounds and vibrations that reduce the accuracy and effectiveness of the APR system to efficiently detect a touch input. Another example includes the Surface Acoustic Wave-based technology, commonly called SAW, such as the ELO IntelliTouch Plus(™) of ELO Touch Systems. The SAW technology sends ultrasonic waves in a guided pattern using reflectors on the surface of the touch screen to detect a touch. However, sending the ultrasonic waves in the guided pattern increases costs and may be difficult to achieve. Additionally, because SAW must propagate on the surface, SAW transmitters and receivers are typically mounted on the same surface where a touch input is to be received. Detecting additional types of inputs, such as multi-touch inputs, may not be possible or may be difficult using SAW or APR technology.

However, due to precision limits of the human finger, a stylus with a narrower tip may be utilized to provide a more precise touch input. It is desirable to be able to distinguish a stylus input from a human finger touch input to be able to provide stylus related functionality. For example, it is desirable to distinguish between a finger input vs. a stylus input. Technologies such as SAW may be unable to distinguish between a finger and a stylus interacting with the guided pattern of the surface acoustic wave. Although a different specialized hardware may be utilized to detect stylus input as compared to hardware utilized to detect human finger input to distinguish the different types of touch inputs, the added cost of including different hardware for different types of touch input detection may be cost prohibitive.

BRIEF DESCRIPTION OF THE DRAWINGS

Various embodiments of the invention are disclosed in the following detailed description and the accompanying drawings.

DETAILED DESCRIPTION

Figure 1:
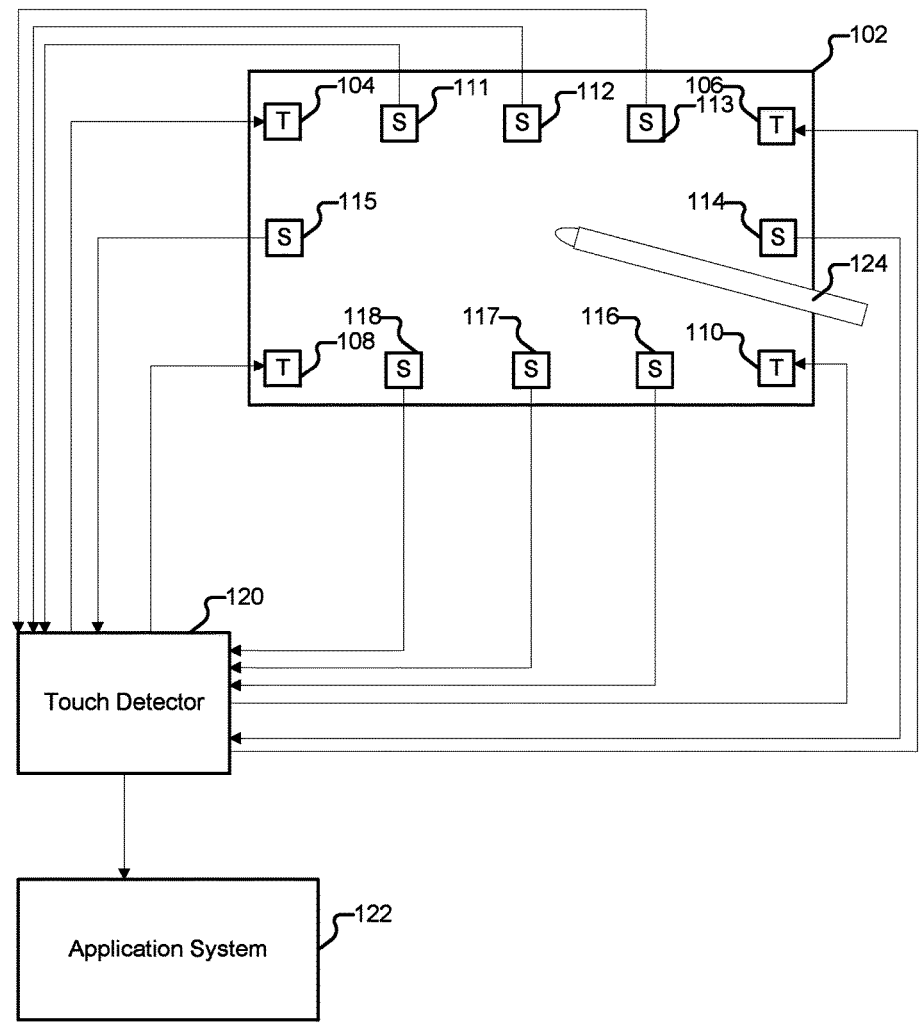
FIG. 1 is a block diagram illustrating an embodiment of a system for detecting a touch input.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting a touch input is disclosed. In some embodiments, a propagating medium is configured to receive a touch input from a touch input indicator device (e.g., a stylus device). The touch input indicator device includes a transmitter that transmits a signal to the propagating medium when the touch input device contacts the propagating medium. For example, a transducer drives a tip of a stylus device with the signal to transmit the signal to the propagating medium when the tip of the stylus comes into contact with the propagating medium. The signal encodes a digital binary data identifying the signal. A receiver is coupled to the propagating medium. The receiver is configured to receive the signal from the touch input indicator device that has been propagated through the propagating medium. For example, a receiver on the propagating medium is able to detect the propagated signal and identify signal that originated from the stylus device by identifying the digital binary data encoded in a detected signal. The received signal is processed to at least in part detect the touch input on a surface of the propagating medium. For example, by comparing timing of when the signal from the touch input device was received at various different receivers located at different locations on the propagating medium, a source contact location of the signal is determined.

In some embodiments, a location of a touch input provided by a passive (i.e., not actively generating a signal using a transmitter/generator) touch source (e.g., user finger) is also detected using the same receiver utilized to detect the touch input of the signal generating touch input indicator device. A transmitter coupled to the propagating medium (distinct from the transmitter in the touch input indicator device) emits a signal to be propagated through the propagating medium. For example, a signal such as an acoustic or ultrasonic signal is propagated freely through the propagating medium with a touch input surface from the transmitter coupled to the propagating medium. The receiver coupled to the propagating medium receives the signal from the transmitter to at least in part detect the location of the touch input by the passive touch source as indicated by the effect of the touch input on the signal. For example, when the surface of the propagating medium is touched by a finger, the emitted signal propagating through the propagating medium is disturbed (e.g., the touch causes an interference with the propagated signal). In some embodiments, by processing the received signals and comparing it against a corresponding expected, a location on the surface associated with the touch input is at least in part determined. In some embodiments, by detecting disturbances of a freely propagated signal, touch input detection technology can be applied to larger surface regions with less or no additional cost due to a larger surface region as compared to certain previous touch detection technologies. Additionally, the optical transparency of a touch screen may not have to be affected as compared to resistive and capacitive touch technologies.

In some embodiments, the touch input includes an input gesture and/or a multi-touch input. In some embodiments, the received signal is used to determine one or more of the following associated with a touch input: a gesture, a coordinate position, touch source type (e.g., passive touch source vs. signal generating touch input indicator device), a time, a time frame, a direction, a velocity, a force magnitude, a proximity magnitude, a pressure, a size, and other measurable or derived parameters. Merely by way of example, the touch detection described herein can be applied to a variety of objects such as a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces.

FIG. 1 is a block diagram illustrating an embodiment of a system for detecting a touch input. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and receivers/sensors 111-118. The locations where transmitters 104, 106, 108, and 110 and receivers 111-118 have been coupled to propagating signal medium 102, as shown in FIG. 1, are merely an example. Other configurations, locations, and numbers of transmitter and sensors may exist in various other embodiments. In some embodiments, a transmitter and a sensor are co-located at the same location using a single transducer that acts as a transceiver. In various embodiments, the propagating medium includes one or more of the following: panel, table, glass, screen, door, floor, whiteboard, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may touch to provide a selection input and a substantially opposite surface of medium 102 is coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

Examples of transmitters 104, 106, 108, and 110 include piezoelectric transducers, electromagnetic transducers, transmitters, sensors, and/or any other transmitters and transducers capable of propagating a signal through medium 102. Examples of sensors 111-118 include piezoelectric transducers, electromagnetic transducers, laser vibrometer transmitters, and/or any other sensors and transducers capable of detecting a signal on medium 102. In some embodiments, the transmitters and sensors shown in FIG. 1 are coupled to medium 102 in a manner that allows a user's input to be detected in a predetermined region of medium 102. Although four transmitters and eight sensors are shown, any number of transmitters and any number of sensors may be used in other embodiments. In the example shown, transmitters 104, 106, 108, and 110 each may propagate a signal through medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 111-118 receive the propagated signals. In another embodiment, the transmitters/sensors in FIG. 1 are attached to a flexible cable coupled to medium 102 via an encapsulant and/or glue material and/or fasteners.

Touch detector 120 is connected to the transmitters and sensors shown in FIG. 1. In some embodiments, detector 120 includes one or more of the following: an integrated circuit chip, a printed circuit board, a processor, and other electrical components and connectors. Detector 120 determines and sends signals to be propagated by transmitters 104, 106, 108, and 110. Detector 120 also receives the signals detected by sensors 111-118. The received signals are processed by detector 120 to detect a touch input from a signal transmitting touch input source (e.g., signal generating stylus) and/or non-signal transmitting (e.g., finger) touch input.

In order to detect a non-signal transmitting touch input, detector 120 determines whether a disturbance associated with a user input has been detected at a location on a surface of medium 102 associated with the disturbance. Detector 120 is in communication with application system 122. Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), touch source type (e.g., passive touch source vs. signal generating touch input indicator device), a time, a status, a direction, a velocity, a force magnitude, a proximity magnitude, a pressure, a size, and other measurable or derived information.

Signal transmitting touch input is provided by a touch input indicator device that actively transmits a signal to be propagated though propagating medium 102. Touch input indicator device 124 includes a tip driven by a transmitter/transducer included in the device. When the tip contacts propagating medium 102, the tip vibrates the propagating medium at the point of contact to propagate the signal of the transmitter of the touch input indicator device through propagating medium 102. Receivers 111-118 detect the propagated signal of touch input indicator device 124 and using the detected signals, identify the contact location of the touch input device as well as a force of the contact. The signal transmitted by touch input indicator device 124 is distinguishable from the signals transmitted by transmitters 104, 106, 108 and 110 (e.g., different binary data encoded signals, different frequencies, etc.). For example, by detecting the signal of touch input indicator device 124, a touch input of device 124 is able to be separately identified as compared to non-signal transmitting touch inputs. In some embodiments, when signal transmitting touch input is provided, the contact of this touch input also disturbs the signals propagated by transmitters 104-110 that are detected by receivers 111-118 to detect the location of the touch input based on the signal disturbance. If a touch input is detected as both a signal transmitting touch input and a non-signal transmitting touch input, the touch input is identified as a signal transmitting touch input rather than a non-signal transmitting touch input.

Figure 2:
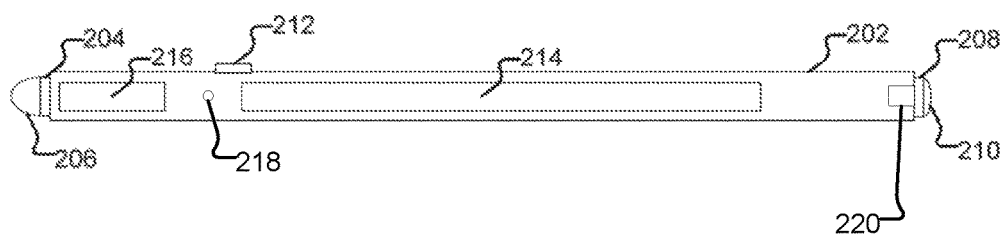
FIG. 2 is a diagram illustrating an example of a touch input indicator device.

FIG. 2 is a diagram illustrating an example of a touch input indicator device. In some embodiments, device 202 is device 124 of FIG. 1. Touch input indicator stylus device 202 includes tip 206 that vibrates to transmit the signal emitted by transmitter 204. Stylus device 202 also includes tip 210 that can be used to propagate a signal emitted by transmitter 208. Examples of transmitters 204 and 208 include a piezoelectric transducer, electromagnetic transducer, or any other transmitters and transducers capable of propagating a signal to a touch input surface via tip 206 or 210. Examples of tips 206 and 210 include an elastomer, glass, metal, or polymer material that will contact a touch input surface (e.g., surface of medium 102 of FIG. 1) to propagate (e.g., by physically vibrating the medium of the contacted surface) a signal transmitted by transmitter 204 or 208. This transmitted signal may propagate through the medium of the touch input surface and the propagated signal is received by a plurality of receivers that process the received signal to determine origin location of the propagating signal corresponding to the location of the touch input. In some embodiments, the transmitted signal includes a pseudorandom binary sequence (PRBS) with or without modulation. In some embodiments, the transmitted signal is an acoustic signal. In some embodiments, the transmitted signal is an ultrasonic signal (e.g., outside the range of human hearing). For example, the transmitted signal is a signal above 20 kHz (e.g., within the range between 80 kHz to 100 kHz). In some embodiments, the signal transmitted by transmitter 204 or 208 includes a sequence selected to optimize autocorrelation (e.g., resulting in narrow/short peaks) of the signal. For example, the signal includes a Zadoff-Chu sequence.

Stylus 202 includes button 212 that may be pressed to select a type of input among a plurality of different types of input. For example, the signal transmitted by transmitter 204 and/or transmitter 208 may change (e.g., change frequency, change content of signal, change pseudorandom binary sequence content of signal, change data encoded in transmitted signal data that identifies type of selected input, etc.) based on the selection of button 212. In various embodiments, button 212 is a push button, a switch, a selector button, a twist selector, etc. Visual display 218 visually indicates a selected type of input. For example, button 212 is utilized to cycle through pen color options and visual display 218 includes an LED that displays the color of the current selected input color. When stylus 202 is utilized to write on a touch input surface, the input of stylus 202 is detected along with the current selected input color type to register the input as being this current selected color. Beyond color, in various embodiments, button 212 is utilized to select any of various other input configurations/options/types (e.g., input width size (e.g., pen size), input brush shape/type, etc.). In some embodiments, visual display 218 includes a screen that displays a current selected input configuration/option/type.

Tip 206 provides a different type of touch input as compared to tip 210. For example, tip 206 is utilized to indicate draw/regular type touch input (e.g., utilized to indicate a line path in a drawing application) and tip 210 is utilized to indicate an erase/blend/secondary type touch input (e.g., utilized to indicate erasure in the drawing application). Stylus device 202 is able to detect which tip is being utilized by detecting a state of press/pressure switch 220. When tip 210 is being pressed on a touch input surface to indicate a touch input, press/pressure switch 220 detects the switch being engaged due to the force applied against tip 210.

The various different types of inputs that are able to be provided using stylus device 202 (e.g., different tips, different settings selected using switch 212, etc.) is indicated to a receiving device (e.g., touch screen device) by encoding in the signal driving the contact tip, an indicator of the type/property of input being provided. For example, the signal includes the same PRBS signal regardless of the type of input being provided along with a signal component (e.g., in a different frequency channel or in a different time slot) that encodes one or more identifiers identifying the input type/setting. In an alternative embodiment, the transmitter of the stylus device transmits a different PRBS signal (e.g., different frequency, content of signal, pseudorandom binary sequence content, etc.) to indicate on the input type/setting/property.

In some embodiments, device 202 is continually outputting/driving the signal to its tip(s) using its transmitter(s) while in active use state. In order to conserve power, device 202 may be placed in a powered down state (e.g., transmitters powered down and not transmitting) when device 202 is not being physically moved (e.g., detected using an included accelerometer, or another pressure switch mounted behind transmitter 204) for a threshold amount of time. Once movement is detected, device 202 may power up from its powered down state and resume outputting/driving the signal to its tip(s). Stylus 202 includes battery 214 that may be replaceable, rechargeable via a wired connection, and/or rechargeable wirelessly (e.g., via induction charging). Stylus 202 includes circuit 216 that includes one or more electrical components to provide the signals to be transmitted by transmitters 204 and 208. For example, circuit 216 includes one or more signal generators (e.g., a signal generator similar to generator 312 of FIG. 3) that generate signal(s) and one or more signal drivers (e.g., a driver similar to driver 314 of FIG. 3) that drive transmitters 204 and 208 with the generated signal(s). In some embodiments, stylus device 202 includes metal contacts that provide an interface for power and/or data communication. For example, metal contacts allow device 202 to be charged when device 202 is placed into a charging dock that engages with the metal contacts. The metal contacts may also be utilized to communicate information (e.g., initialization/pairing information). For example, multiple stylus devices are able to be utilized at the same time on a touch input surface of a receiving device and each stylus device is to transmit a different signal (e.g., different PRBS signals, different signal frequency, etc.) to be able to distinguish the different stylus devices on the receiving device. In order to coordinate the different signals to be transmitted by the different stylus devices, an identifier of the signal to be transmitted by a particular stylus device is assigned by a touch input receiving device and communicated to the stylus devices via a data connection interfaced by the metal contacts of the stylus devices (e.g., during paring with the receiving device). In some embodiments, rather than using metal contacts, power is provided wirelessly (e.g., induction power) and/or data is communicated wirelessly (e.g., Bluetooth, Wi-Fi, etc.).

Figure 3:
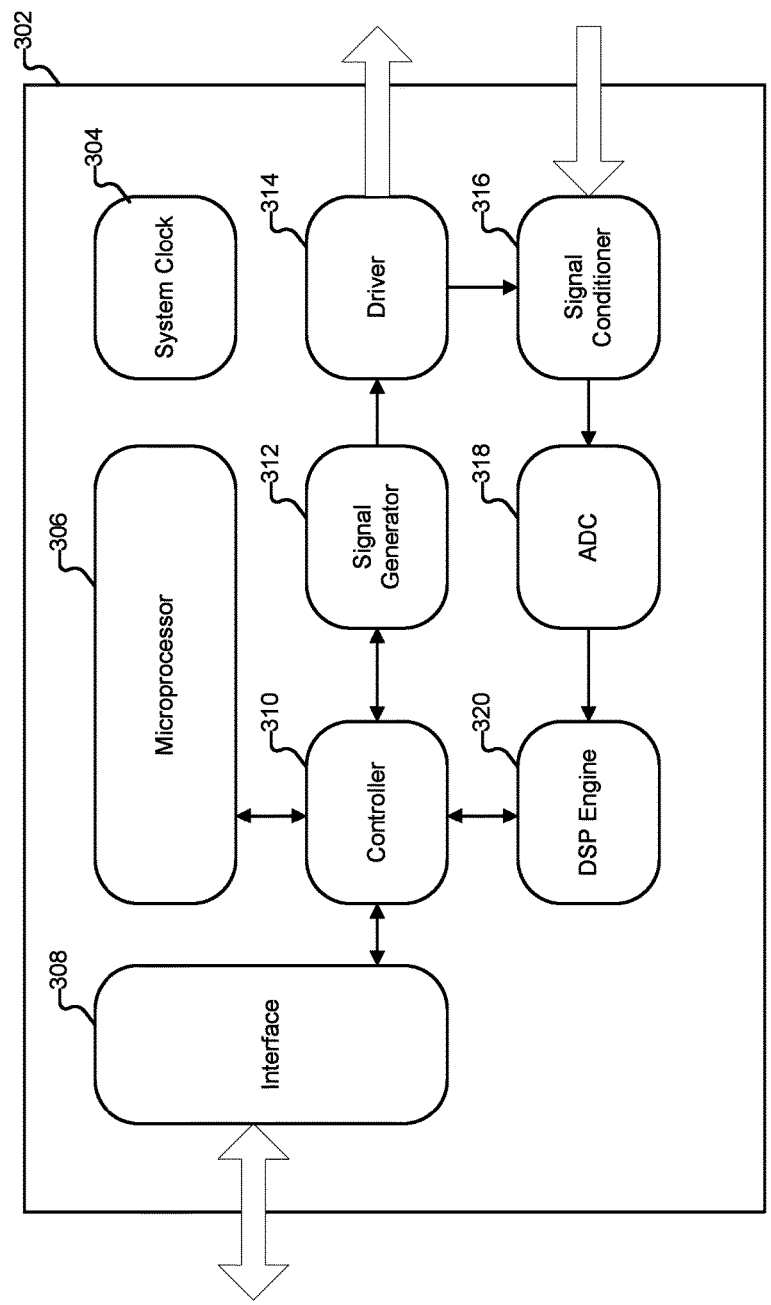
FIG. 3 is a block diagram illustrating an embodiment of a system for detecting a touch input.

FIG. 3 is a block diagram illustrating an embodiment of a system for detecting a touch input. The system of FIG. 3 may be utilized to detect a touch input from either a passive (i.e., not actively generating a signal) touch source or a signal generating touch input indicator device. In some embodiments, touch detector 302 is included in touch detector 120 of FIG. 1. In some embodiments, the system of FIG. 3 is integrated in an integrated circuit chip. Touch detector 302 includes system clock 304 that provides a synchronous system time source to one or more other components of detector 302. Controller 310 controls data flow and/or commands between microprocessor 306, interface 308, DSP engine 320, and signal generator 312. In some embodiments, microprocessor 306 processes instructions and/or calculations that can be used to program software/firmware and/or process data of detector 302. In some embodiments, a memory is coupled to microprocessor 306 and is configured to provide microprocessor 306 with instructions.

Signal generator 312 generates signals to be used to propagate signals such as signals propagated by transmitters 104, 106, 108, and 110 of FIG. 1. For example, signal generator 312 generates pseudorandom binary sequence signals that are converted from digital to analog signals. Different signals (e.g., a different signal for each transmitter) may be generated by signal generator 312 by varying a phase of the signals (e.g., code division multiplexing), a frequency range of the signals (e.g., frequency division multiplexing), or a timing of the signals (e.g., time division multiplexing). In some embodiments, spectral control (e.g., signal frequency range control) of the signal generated by signal generator 312 is performed. For example, microprocessor 306, DSP engine 320, and/or signal generator 312 determines a windowing function and/or amplitude modulation to be utilized to control the frequencies of the signal generated by signal generator 312. Examples of the windowing function include a Hanning window and raised cosine window. Examples of the amplitude modulation include signal sideband modulation and vestigial sideband modulation. In some embodiments, the determined windowing function may be utilized by signal generator 312 to generate a signal to be modulated to a carrier frequency. The carrier frequency may be selected such that the transmitted signal is an ultrasonic signal. For example, the transmitted signal to be propagated through a propagating medium is desired to be an ultrasonic signal to minimize undesired interference with sonic noise and minimize excitation of undesired propagation modes of the propagating medium. The modulation of the signal may be performed using a type of amplitude modulation such as signal sideband modulation and vestigial sideband modulation to perform spectral of the signal. The modulation may be performed by signal generator 312 and/or driver 314. Driver 314 receives the signal from generator 312 and drives one or more transmitters, such as transmitters 104, 106, 108, and 110 of FIG. 1, to propagate signals through a medium.

A signal detected from a sensor such as sensor/receiver 112 of FIG. 1 is received by detector 302 and signal conditioner 316 conditions (e.g., filters) the received analog signal for further processing. For example, signal conditioner 316 receives the signals transmitted by transmitters (e.g., transmitters 104, 106, 108 and/or 110 of FIG. 1 and/or transmitters 204 and/or 208 of FIG. 2) and performs echo cancellation of the signal received by signal conditioner 316. The conditioned signal is converted to a digital signal by analog-to-digital converter 318. The converted signal is processed by digital signal processor engine 320. For example, DSP engine 320 separates components corresponding to different signals propagated by different transmitters from the received signal and each component is correlated against a reference signal. The result of the correlation may be used by microprocessor 306 to determine a location associated with a touch input. For example, microprocessor 306 compares relative differences of disturbances detected in signals originating from different transmitters (e.g., transmitters coupled to propagating medium to detect touch inputs from a passive touch source) and/or received at different receivers/sensors to determine the location. In another example, DSP engine 320 identifies signal components corresponding to a signal propagated by a touch input device (e.g., stylus 124 of FIG. 1) from the received signals and microprocessor 306 compares the timing of the components to identify a location of the touch input device on the propagating medium.

In some embodiments, DSP engine 320 correlates the converted signal against a reference signal to determine a time domain signal that represents a time value (e.g., time delay caused by a finger touch input disturbance to a propagated signal or time value of when stylus touch input signal was detected at a receiver). In some embodiments, DSP engine 320 performs dispersion compensation. For example, the time delay signal that results from correlation is compensated for dispersion in the touch input surface medium and translated to a spatial domain signal that represents a physical distance traveled by the propagated signal disturbed by the touch input. In some embodiments, DSP engine 320 performs base pulse correlation. For example, the spatial domain signal is filtered using a match filter to reduce noise in the signal. A result of DSP engine 320 may be used by microprocessor 306 to determine a location associated with a user touch input. For example, microprocessor 306 determines a hypothesis location where a touch input may have been received and calculates an expected signal that is expected to be generated if a touch input was received at the hypothesis location and the expected signal is compared with a result of DSP engine 320 to determine whether a touch input was provided at the hypothesis location.

Interface 308 provides an interface for microprocessor 306 and controller 310 that allows an external component to access and/or control detector 302. For example, interface 308 allows detector 302 to communicate with application system 122 of FIG. 1 and provides the application system with location information associated with a user touch input.

Figure 4:
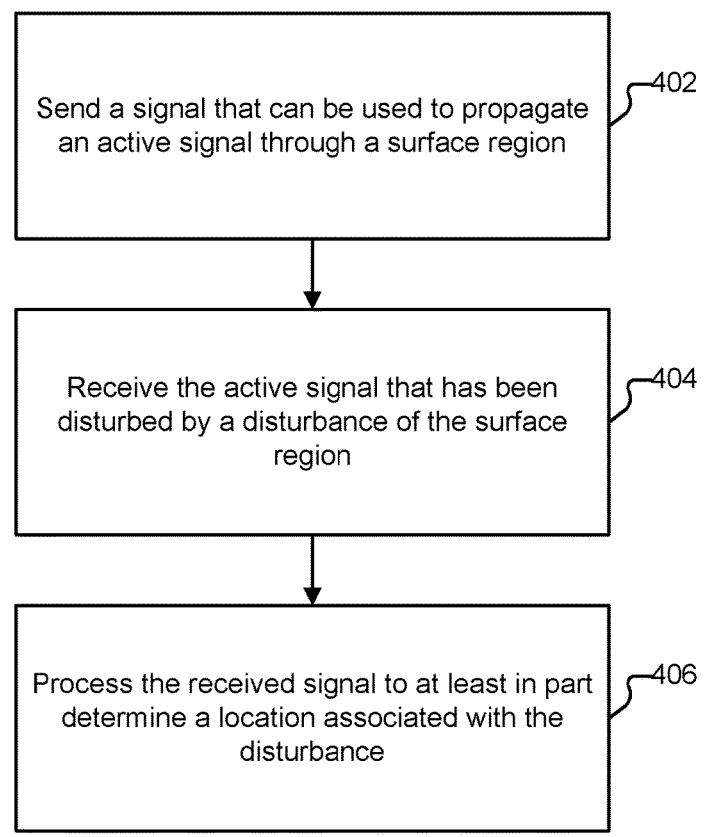
FIG. 4 is a flow chart illustrating an embodiment of a process for detecting a disturbance touch input.

FIG. 4 is a flow chart illustrating an embodiment of a process for detecting a disturbance touch input provided by a passive touch source. For example, the process is utilized to detect a finger touch input that disturbs propagated signals. In some embodiments, the process of FIG. 4 is at least in part implemented on touch detector 120 of FIG. 1 and/or touch detector 302 of FIG. 3.

At 402, a signal that can be used to propagate an active signal through a surface region is sent. In some embodiments, sending the signal includes driving (e.g., using driver 314 of FIG. 3) a transmitter such as a transducer (e.g., transmitter 104 of FIG. 1) to propagate an active signal (e.g., acoustic or ultrasonic) through a propagating medium with the surface region. In some embodiments, the signal includes a sequence selected to optimize autocorrelation (e.g., resulting in narrow/short peaks) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

When attempting to propagate signal through a medium such as glass in order to detect touch inputs on the medium, the range of frequencies that may be utilized in the transmitted signal determines the bandwidth required for the signal as well as the propagation mode of the medium excited by the signal and noise of the signal.

With respect to bandwidth, if the signal includes more frequency components than necessary to achieve a desired function, then the signal is consuming more bandwidth than necessary, leading to wasted resource consumption and slower processing times.

With respect to the propagation modes of the medium, a propagation medium such as a glass likes to propagate a signal (e.g., an ultrasonic/sonic signal) in certain propagation modes. For example, in the A0 propagation mode of glass the propagated signal travels in waves up and down perpendicular to a surface of the glass (e.g., by bending the glass) whereas in the S0 propagation mode of glass the propagated signal travels in waves up and down parallel to the glass (e.g., by compressing and expanding the glass). A0 mode is desired over S0 mode in touch detection because a touch input contact on a glass surface disturbs the perpendicular bending wave of the A0 mode and the touch input does not significantly disturb the parallel compression waves of the S0 mode. The example glass medium has higher order propagation modes such as A1 mode and S1 mode that become excited with different frequencies of the propagated signals.

With respect to the noise of the signal, if the propagated signal is in the audio frequency range of humans, a human user would be able to hear the propagated signal and may detract from the user's user experience. If the propagated signal included frequency components that excited higher order propagation modes of the propagating medium, the signal may create undesirable noise within the propagating medium that makes detection of touch input disturbances of the propagated signal difficult to achieve.

In some embodiments, the sending the signal includes performing spectral control of the signal. In some embodiments, performing spectral control on the signal includes controlling the frequencies included in the signal. In order to perform spectral control, a windowing function (e.g., Hanning window, raised cosine window, etc.) and/or amplitude modulation (e.g., signal sideband modulation, vestigial sideband modulation, etc.) may be utilized. In some embodiments, spectral control is performed to attempt to only excite the A0 propagation mode of the propagation medium. In some embodiments, spectral control is performed to limit the frequency range of the propagated signal to be within 50 kHz to 250 kHz.

In some embodiments, the sent signal includes a pseudorandom binary sequence. The binary sequence may be represented using a square pulse. However, modulated signal of the square pulse includes a wide range of frequency components due to the sharp square edges of the square pulse. In order to efficiently transmit the pseudorandom binary sequence, it is desirable to "smooth out" sharp edges of the binary sequence signal by utilizing a shaped pulse. A windowing function may be utilized to "smooth out" the sharp edges and reduce the frequency range of the signal. A windowing function such as Hanning window and/or raised cosine window may be utilized. In some embodiments, the type and/or one or more parameters of the windowing function are determined based at least in part on a property of a propagation medium such as medium 102 of FIG. 1. For example, information about propagation modes and associated frequencies of the propagation medium are utilized to select the type and/or parameter(s) of the windowing function (e.g., to excite desired propagation mode and not excite undesired propagation mode). In some embodiments, a type of propagation medium is utilized to select the type and/or parameter(s) of the windowing function. In some embodiments, a dispersion coefficient, a size, a dimension, and/or a thickness of the propagation medium is utilized to select the type and/or parameter(s) of the windowing function. In some embodiments, a property of a transmitter is utilized to select the type and/or parameter(s) of the windowing function.

In some embodiments, sending the signal includes modulating (e.g., utilize amplitude modulation) the signal. For example, the desired baseband signal (e.g., a pseudorandom binary sequence signal) is desired to be transmitted at a carrier frequency (e.g., ultrasonic frequency). In this example, the amplitude of the signal at the carrier frequency may be varied to send the desired baseband signal (e.g., utilizing amplitude modulation). However, traditional amplitude modulation (e.g., utilizing double-sideband modulation) produces an output signal that has twice the frequency bandwidth of the original baseband signal. Transmitting this output signal consumes resources that otherwise do not have to be utilized. In some embodiments, single-sideband modulation is utilized. In some embodiments, in single-sideband modulation, the output signal utilizes half of the frequency bandwidth of double-sideband modulation by not utilizing a redundant second sideband included in the double-sideband modulated signal. In some embodiments, vestigial sideband modulation is utilized. For example, a portion of one of the redundant sidebands is effectively removed from a corresponding double-sideband modulated signal to form a vestigial sideband signal. In some embodiments, double-sideband modulation is utilized.

In some embodiments, sending the signal includes determining the signal to be transmitted by a transmitter such that the signal is distinguishable from other signal(s) transmitted by other transmitters. In some embodiments, sending the signal includes determining a phase of the signal to be transmitted (e.g., utilize code division multiplexing/CDMA). For example, an offset within a pseudorandom binary sequence to be transmitted is determined. In this example, each transmitter (e.g., transmitters 104, 106, 108, and 110 of FIG. 1 and transmitters 204 and/or 208 of FIG. 2) transmits a signal with the same pseudorandom binary sequence but with a different phase/offset. The signal offset/phase difference between the signals transmitted by the transmitters may be equally spaced (e.g., 64-bit offset for each successive signal) or not equally spaced (e.g., different offset signals). The phase/offset between the signals may be selected such that it is long enough to reliably distinguish between different signals transmitted by different transmitters. In some embodiments, the signal is selected such that the signal is distinguishable from other signals transmitted and propagated through the medium. In some embodiments, the signal is selected such that the signal is orthogonal to other signals (e.g., each signal orthogonal to each other) transmitted and propagated through the medium.

In some embodiments, sending the signal includes determining a frequency of the signal to be transmitted (e.g., utilize frequency division multiplexing/FDMA). For example, a frequency range to be utilized for the signal is determined. In this example, each transmitter (e.g., transmitters 104, 106, 108, and 110 of FIG. 1 and transmitters 204 and/or 208 of FIG. 2) transmits a signal in a different frequency range as compared to signals transmitted by other transmitters. The range of frequencies that can be utilized by the signals transmitted by the transmitters is divided among the transmitters. In some cases, if the range of frequencies that can be utilized by the signals is small, it may be difficult to transmit all of the desired different signals of all the transmitters. Thus, the number of transmitters that can be utilized with frequency division multiplexing/FDMA may be smaller than can be utilized with code division multiplexing/CDMA.

In some embodiments, sending the signal includes determining a timing of the signal to be transmitted (e.g., utilize time division multiplexing/TDMA). For example, a time when the signal should be transmitted is determined. In this example, each transmitter (e.g., transmitters 104, 106, 108, and 110 of FIG. 1 and transmitters 204 and/or 208 of FIG. 2) transmits a signal in different time slots as compared to signals transmitted by other transmitters. This may allow the transmitters to transmit signals in a round-robin fashion such that only one transmitter is emitting/transmitting at one time. A delay period may be inserted between periods of transmission of different transmitters to allow the signal of the previous transmitter to sufficiently dissipate before transmitting a new signal of the next transmitter. In some cases, time division multiplexing/TDMA may be difficult to utilize in cases where fast detection of touch input is desired because time division multiplexing/TDMA slows down the speed of transmission/detection as compared to code division multiplexing/CDMA.

At 404, the active signal that has been disturbed by a disturbance of the surface region is received. The disturbance may be associated with a user touch indication. In some embodiments, the disturbance causes the active signal that is propagating through a medium to be attenuated and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, determining the location includes extracting a desired signal from the received signal at least in part by removing or reducing undesired components of the received signal such as disturbances caused by extraneous noise and vibrations not useful in detecting a touch input. In some embodiments, components of the received signal associated with different signals of different transmitters are separated. For example, different signals originating from different transmitters are isolated from other signals of other transmitters for individual processing. In some embodiments, determining the location includes comparing at least a portion of the received signal (e.g., signal component from a single transmitter) to a reference signal (e.g., reference signal corresponding to the transmitter signal) that has not been affected by the disturbance. The result of the comparison may be used with a result of other comparisons performed using the reference signal and other signal(s) received at a plurality of sensors.

In some embodiments, receiving the received signal and processing the received signal are performed on a periodic interval. For example, the received signal is captured in 5 ms intervals and processed. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes processing the received signal and comparing the processed received signal with a calculated expected signal associated with a hypothesis touch contact location to determine whether a touch contact was received at the hypothesis location of the calculated expected signal. Multiple comparisons may be performed with various expected signals associated with different hypothesis locations until the expected signal that best matches the processed received signal is found and the hypothesis location of the matched expected signal is identified as the touch contact location(s) of a touch input. For example, signals received by sensors (e.g., sensors 111-118 of FIG. 1) from various transmitters (e.g., transmitters 104, 106, 108, and 110 of FIG. 1 and transmitters 204 and/or 208 of FIG. 2) are compared with corresponding expected signals to determine a touch input location (e.g., single or multi-touch locations) that minimizes the overall difference between all respective received and expected signals.

The location, in some embodiments, is a location (e.g., a location coordinate) on the surface region where a user has provided a touch input. In addition to determining the location, one or more of the following information associated with the disturbance may be determined at 406: a gesture, simultaneous user indications (e.g., multi-touch input), type of contact (non-active or active input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
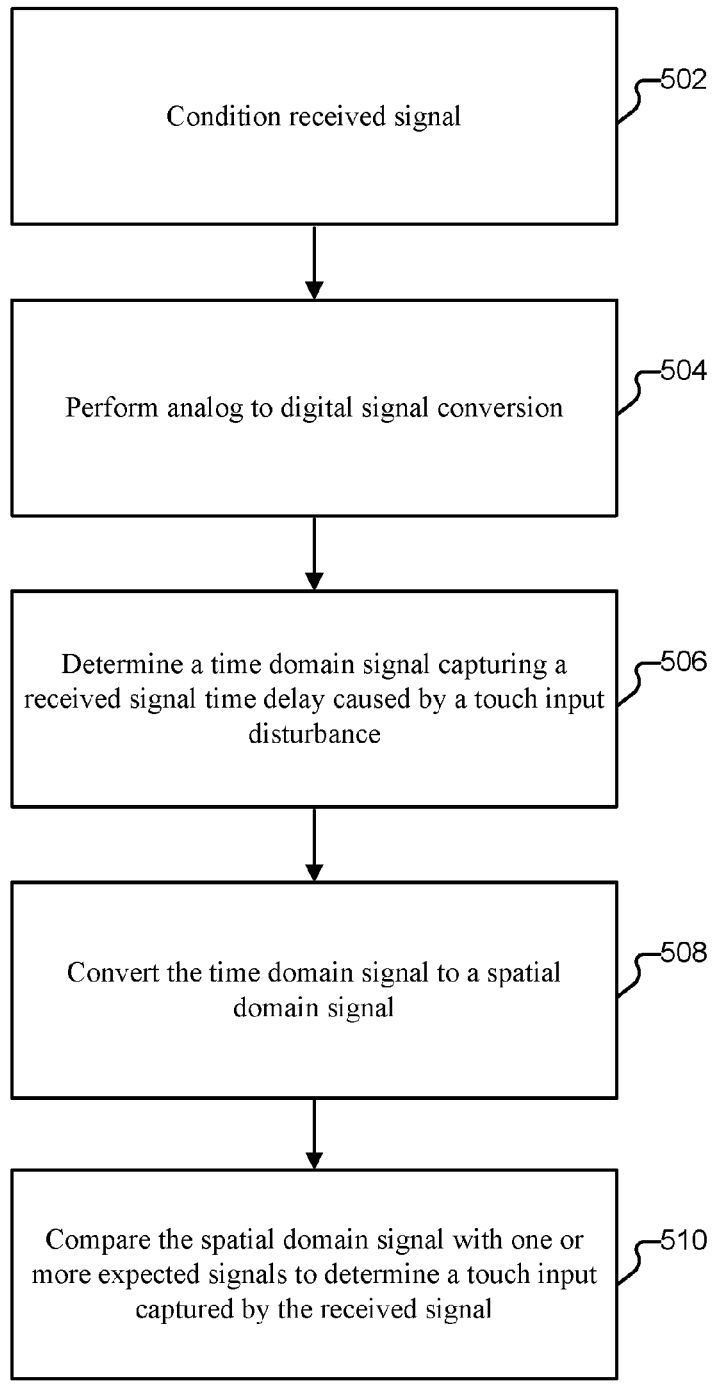
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1 and/or touch detector 302 of FIG. 3. In some embodiments, at least a portion of the process of FIG. 5 is repeated for each combination of transmitter and sensor pair. For example, for each active signal transmitted by a transmitter (e.g., transmitted by transmitter 104, 106, 108, or 110 of FIG. 1 and transmitters 204 and/or 208 of FIG. 2), at least a portion of the process of FIG. 5 is repeated for each sensor (e.g., sensors 111-118 of FIG. 1) receiving the active signal. In some embodiments, the process of FIG. 5 is performed periodically (e.g., 5 ms periodic interval).

At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal-to-noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used.

At 506, a time domain signal capturing a received signal time delay caused by a touch input disturbance is determined. In some embodiments, determining the time domain signal includes correlating the received signal (e.g., signal resulting from 504) to locate a time offset in the converted signal (e.g., perform pseudorandom binary sequence deconvolution) where a signal portion that likely corresponds to a reference signal (e.g., reference pseudorandom binary sequence that has been transmitted through the medium) is located. For example, a result of the correlation can be plotted as a graph of time within the received and converted signal (e.g., time-lag between the signals) vs. a measure of similarity. In some embodiments, performing the correlation includes performing a plurality of correlations. For example, a coarse correlation is first performed then a second level of fine correlation is performed. In some embodiments, a baseline signal that has not been disturbed by a touch input disturbance is removed in the resulting time domain signal. For example, a baseline signal representing a measured signal (e.g., a baseline time domain signal) associated with a received active signal that has not been disturbed by a touch input disturbance is subtracted from a result of the correlation to further isolate effects of the touch input disturbance by removing components of the steady state baseline signal not affected by the touch input disturbance.

At 508, the time domain signal is converted to a spatial domain signal. In some embodiments, converting the time domain signal includes converting the time domain signal determined at 506 into a spatial domain signal that translates the time delay represented in the time domain signal to a distance traveled by the received signal in the propagating medium due to the touch input disturbance. For example, a time domain signal that can be graphed as time within the received and converted signal vs. a measure of similarity is converted to a spatial domain signal that can be graphed as distance traveled in the medium vs. the measure of similarity.

In some embodiments, performing the conversion includes performing dispersion compensation. For example, using a dispersion curve characterizing the propagating medium, time values of the time domain signal are translated to distance values in the spatial domain signal. In some embodiments, a resulting curve of the time domain signal representing a distance likely traveled by the received signal due to a touch input disturbance is narrower than the curve contained in the time domain signal representing the time delay likely caused by the touch input disturbance. In some embodiments, the time domain signal is filtered using a match filter to reduce undesired noise in the signal. For example, using a template signal that represents an ideal shape of a spatial domain signal, the converted spatial domain signal is match filtered (e.g., spatial domain signal correlated with the template signal) to reduce noise not contained in the bandwidth of the template signal. The template signal may be predetermined by applying a sample touch input to a touch input surface and measuring a received signal.

At 510, the spatial domain signal is compared with one or more expected signals to determine a touch input captured by the received signal. In some embodiments, comparing the spatial domain signal with the expected signal includes generating expected signals that would result if a touch contact was received at hypothesis locations. For example, a hypothesis set of one or more locations (e.g., single touch or multi-touch locations) where a touch input might have been received on a touch input surface is determined, and an expected spatial domain signal that would result at 508 if touch contacts were received at the hypothesis set of location(s) is determined (e.g., determined for a specific transmitter and sensor pair). The expected spatial domain signal may be compared with the actual spatial signal determined at 508. The hypothesis set of one or more locations may be one of a plurality of hypothesis sets of locations (e.g., exhaustive set of possible touch contact locations on a coordinate grid dividing a touch input surface).

The proximity of location(s) of a hypothesis set to the actual touch contact location(s) captured by the received signal may be proportional to the degree of similarity between the expected signal of the hypothesis set and the spatial signal determined at 508. In some embodiments, signals received by sensors (e.g., sensors 111-118 of FIG. 1) from transmitters (e.g., transmitters 104, 106, 108, and 110 of FIG. 1 and transmitters 204 and/or 208 of FIG. 2) are compared with corresponding expected signals for each sensor/transmitter pair to select a hypothesis set that minimizes the overall difference between all respective detected and expected signals. In some embodiments, once a hypothesis set is selected, another comparison between the determined spatial domain signals and one or more new expected signals associated with finer resolution hypothesis touch location(s) (e.g., locations on a new coordinate grid with more resolution than the coordinate grid used by the selected hypothesis set) near the location(s) of the selected hypothesis set is determined.

Figure 6:
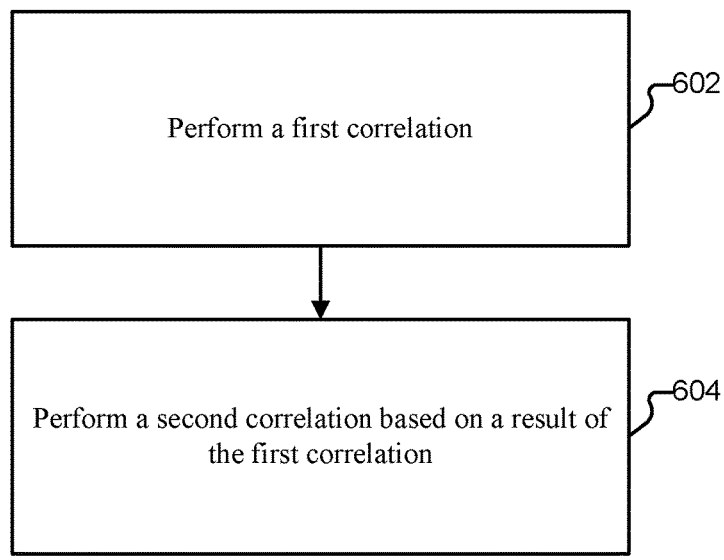
FIG. 6 is a flow chart illustrating an embodiment of a process for determining time domain signal capturing of a disturbance caused by a touch input.

FIG. 6 is a flow chart illustrating an embodiment of a process for determining time domain signal capturing of a disturbance caused by a touch input. In some embodiments, the process of FIG. 6 is included in 506 of FIG. 5. The process of FIG. 6 may be implemented in touch detector 120 of FIG. 1 and/or touch detector 302 of FIG. 3.

At 602, a first correlation is performed. In some embodiments, performing the first correlation includes correlating a received signal (e.g., resulting converted signal determined at 504 of FIG. 5) with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a force associated with a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration. The reference signal may be chosen so that calculations required to be performed during the correlation may be simplified. For example, the reference signal is a simplified reference signal that can be used to efficiently correlate the reference signal over a relatively large time difference (e.g., lag-time) between the received and converted signal and the reference signal.

At 604, a second correlation is performed based on a result of the first correlation. Performing the second correlation includes correlating (e.g., cross-correlation or convolution similar to step 602) a received signal (e.g., resulting converted signal determined at 504 of FIG. 5) with a second reference signal. The second reference signal is a more complex/detailed (e.g., more computationally intensive) reference signal as compared to the first reference signal used in 602. In some embodiments, the second correlation is performed because using the second reference signal in 602 may be too computationally intensive for the time interval required to be correlated in 602. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that corresponds to a disturbance caused by a touch input at a location on a surface of a propagating medium. In other embodiments, the second correlation is optional. For example, only a single correlation step is performed. Any number of levels of correlations may be performed in other embodiments.

Figure 7:
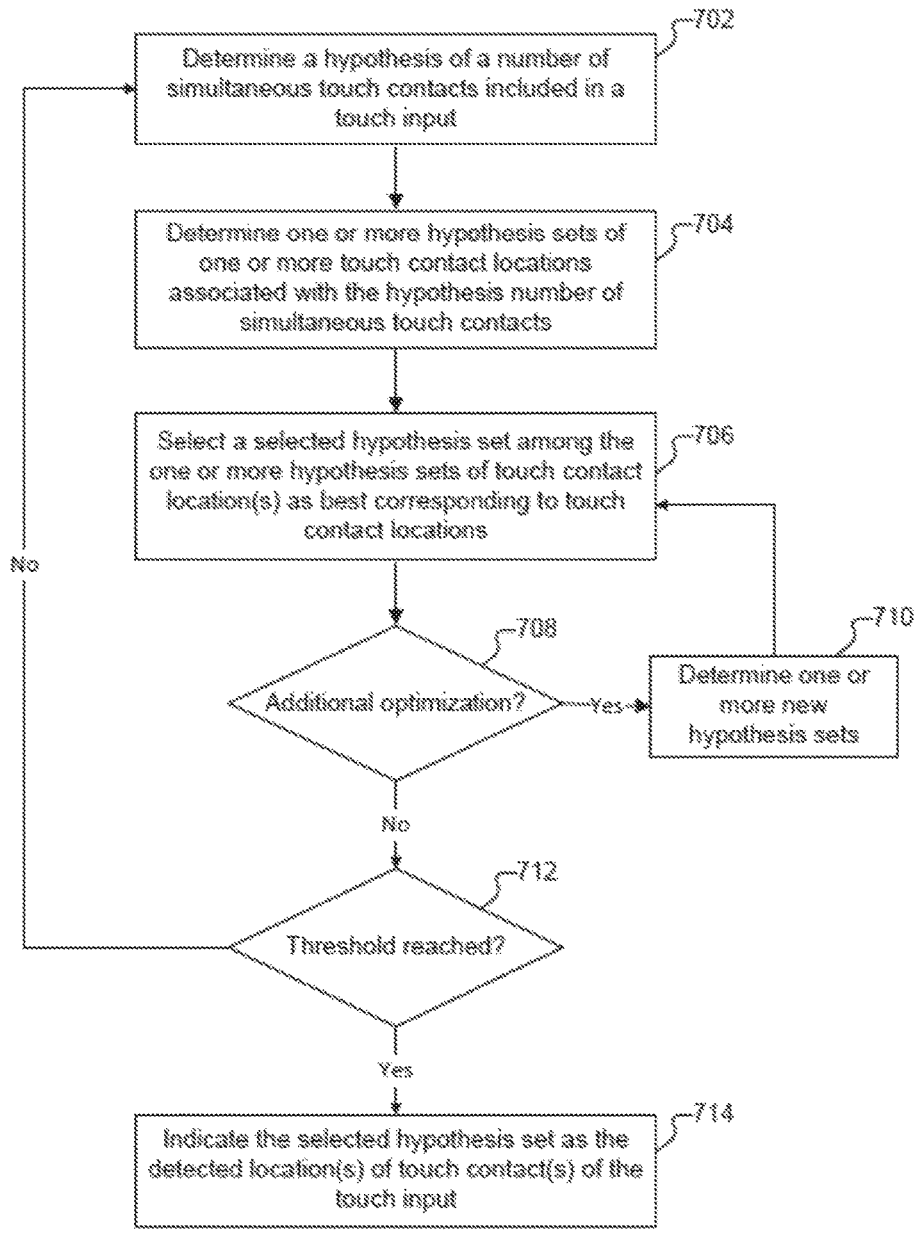
FIG. 7 is a flow chart illustrating an embodiment of a process comparing spatial domain signals with one or more expected signals to determine touch contact location(s) of a touch input.

FIG. 7 is a flow chart illustrating an embodiment of a process comparing spatial domain signals with one or more expected signals to determine touch contact location(s) of a touch input. In some embodiments, the process of FIG. 7 is included in 510 of FIG. 5. The process of FIG. 7 may be implemented in touch detector 120 of FIG. 1 and/or touch detector 302 of FIG. 3.

At 702, a hypothesis of a number of simultaneous touch contacts included in a touch input is determined. In some embodiments, when detecting a location of a touch contact, the number of simultaneous contacts being made to a touch input surface (e.g., surface of medium 102 of FIG. 1) is desired to be determined. For example, it is desired to determine the number of fingers touching a touch input surface (e.g., single touch or multi-touch). In some embodiments, in order to determine the number of simultaneous touch contacts, the hypothesis number is determined and the hypothesis number is tested to determine whether the hypothesis number is correct. In some embodiments, the hypothesis number is initially determined as zero (e.g., associated with no touch input being provided). In some embodiments, determining the hypothesis number of simultaneous touch contacts includes initializing the hypothesis number to be a previously determined number of touch contacts. For example, a previous execution of the process of FIG. 7 determined that two touch contacts are being provided simultaneously and the hypothesis number is set as two. In some embodiments, determining the hypothesis number includes incrementing or decrementing a previously determined hypothesis number of touch contacts. For example, a previously determined hypothesis number is 2 and determining the hypothesis number includes incrementing the previously determined number and determining the hypothesis number as the incremented number (i.e., 3). In some embodiments, each time a new hypothesis number is determined, a previously determined hypothesis number is iteratively incremented and/or decremented unless a threshold maximum (e.g., 10) and/or threshold minimum (e.g., 0) value has been reached.

At 704, one or more hypothesis sets of one or more touch contact locations associated with the hypothesis number of simultaneous touch contacts are determined. In some embodiments, it is desired to determine the coordinate locations of fingers touching a touch input surface. In some embodiments, in order to determine the touch contact locations, one or more hypothesis sets are determined on potential location(s) of touch contact(s) and each hypothesis set is tested to determine which hypothesis set is most consistent with a detected data.

In some embodiments, determining the hypothesis set of potential touch contact locations includes dividing a touch input surface into a constrained number of points (e.g., divide into a coordinate grid) where a touch contact may be detected. For example, in order to initially constrain the number of hypothesis sets to be tested, the touch input surface is divided into a coordinate grid with relatively large spacing between the possible coordinates. Each hypothesis set includes a number of location identifiers (e.g., location coordinates) that match the hypothesis number determined in 702. For example, if two was determined to be the hypothesis number in 702, each hypothesis set includes two location coordinates on the determined coordinate grid that correspond to potential locations of touch contacts of a received touch input. In some embodiments, determining the one or more hypothesis sets includes determining exhaustive hypothesis sets that exhaustively cover all possible touch contact location combinations on the determined coordinate grid for the determined hypothesis number of simultaneous touch contacts. In some embodiments, a previously determined touch contact location(s) of a previous determined touch input is initialized as the touch contact location(s) of a hypothesis set.

At 706, a selected hypothesis set is selected among the one or more hypothesis sets of touch contact location(s) as best corresponding to touch contact locations captured by detected signal(s). In some embodiments, one or more propagated active signals (e.g., signal transmitted at 402 of FIG. 4) that have been disturbed by a touch input on a touch input surface are received (e.g., received at 404 of FIG. 4) by one or more sensors such as sensors 111-118 of FIG. 1. Each active signal transmitted from each transmitter (e.g., different active signals each transmitted by transmitters 104, 106, 108, and 110 of FIG. 1 and transmitters 204 and/or 208 of FIG. 2) is received by each sensor (e.g., sensors 111-118 of FIG. 1) and may be processed to determine a detected signal (e.g., spatial domain signal determined at 508 of FIG. 5) that characterizes a signal disturbance caused by the touch input. In some embodiments, for each hypothesis set of touch contact location(s), an expected signal is determined for each signal expected to be received at one or more sensors. The expected signal may be determined using a predetermined function that utilizes one or more predetermined coefficients (e.g., coefficient determined for a specific sensor and/or transmitter transmitting a signal to be received at the sensor) and the corresponding hypothesis set of touch contact location(s). The expected signal(s) may be compared with corresponding detected signal(s) to determine an indicator of a difference between all the expected signal(s) for a specific hypothesis set and the corresponding detected signals. By comparing the indicators for each of the one or more hypothesis sets, the selected hypothesis set may be selected (e.g., hypothesis set with the smallest indicated difference is selected).

At 708, it is determined whether additional optimization is to be performed. In some embodiments, determining whether additional optimization is to be performed includes determining whether any new hypothesis set(s) of touch contact location(s) should be analyzed in order to attempt to determine a better selected hypothesis set. For example, a first execution of step 706 utilizes hypothesis sets determined using locations on a larger distance increment coordinate grid overlaid on a touch input surface and additional optimization is to be performed using new hypothesis sets that include locations from a coordinate grid with smaller distance increments. Additional optimizations may be performed any number of times. In some embodiments, the number of times additional optimizations are performed is predetermined. In some embodiments, the number of times additional optimizations are performed is dynamically determined. For example, additional optimizations are performed until a comparison threshold indicator value for the selected hypothesis set is reached and/or a comparison indicator for the selected hypothesis set does not improve by a threshold amount. In some embodiments, for each optimization iteration, optimization may be performed for only a single touch contact location of the selected hypothesis set and other touch contact locations of the selected hypothesis set may be optimized in a subsequent iteration of optimization.

If at 708 it is determined that additional optimization should be performed, at 710, one or more new hypothesis sets of one or more touch contact locations associated with the hypothesis number of the touch contacts are determined based on the selected hypothesis set. In some embodiments, determining the new hypothesis sets includes determining location points (e.g., more detailed resolution locations on a coordinate grid with smaller distance increments) near one of the touch contact locations of the selected hypothesis set in an attempt to refine the one of the touch contact locations of the selected hypothesis set. The new hypothesis sets may each include one of the newly determined location points, and the other touch contact location(s), if any, of a new hypothesis set may be the same locations as the previously selected hypothesis set. In some embodiments, the new hypothesis sets may attempt to refine all touch contact locations of the selected hypothesis set. The process proceeds back to 706, whether or not a newly selected hypothesis set (e.g., if previously selected hypothesis set still best corresponds to detected signal(s), the previously selected hypothesis set is retained as the new selected hypothesis set) is selected among the newly determined hypothesis sets of touch contact location(s).

If at 708 it is determined that additional optimization should not be performed, at 712, it is determined whether a threshold has been reached. In some embodiments, determining whether a threshold has been reached includes determining whether the determined hypothesis number of contact points should be modified to test whether a different number of contact points has been received for the touch input. In some embodiments, determining whether the threshold has been reached includes determining whether a comparison threshold indicator value for the selected hypothesis set has been reached and/or a comparison indicator for the selected hypothesis set did not improve by a threshold amount since a previous determination of a comparison indicator for a previously selected hypothesis set. In some embodiments, determining whether the threshold has been reached includes determining whether a threshold amount of energy still remains in a detected signal after accounting for the expected signal of the selected hypothesis set. For example, a threshold amount of energy still remains if an additional touch contact needs be included in the selected hypothesis set.

If at 712, it is determined that the threshold has not been reached, the process continues to 702 where a new hypothesis number of touch inputs is determined. The new hypothesis number may be based on the previous hypothesis number. For example, the previous hypothesis number is incremented by one as the new hypothesis number.

If at 712, it is determined that the threshold has been reached, at 714, the selected hypothesis set is indicated as the detected location(s) of touch contact(s) of the touch input. For example, a location coordinate(s) of a touch contact(s) is provided.

Figure 8:
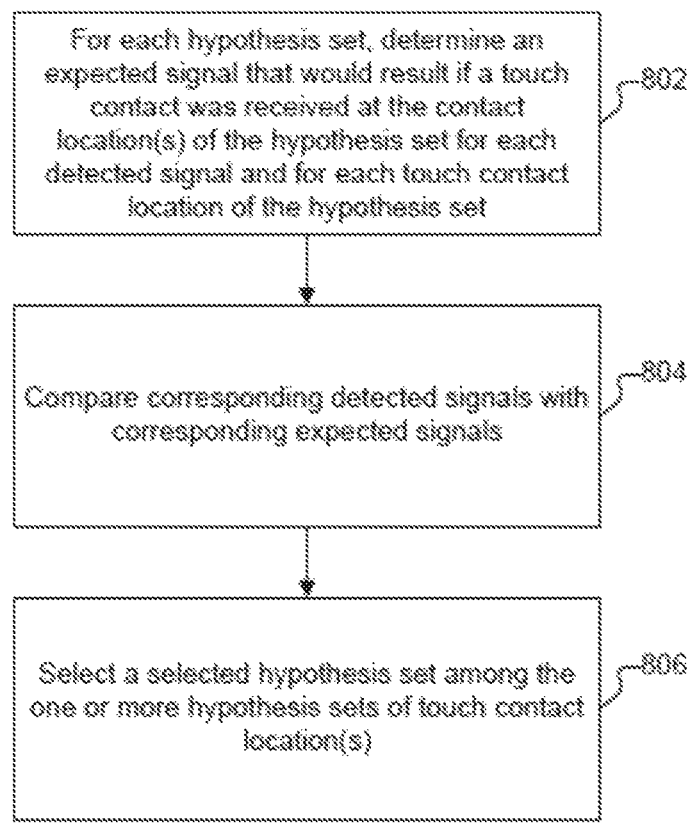
FIG. 8 is a flowchart illustrating an embodiment of a process for selecting a selected hypothesis set of touch contact location(s).

FIG. 8 is a flowchart illustrating an embodiment of a process for selecting a selected hypothesis set of touch contact location(s). In some embodiments, the process of FIG. 8 is included in 706 of FIG. 7. The process of FIG. 8 may be implemented in touch detector 120 of FIG. 1 and/or touch detector 302 of FIG. 3.

At 802, for each hypothesis set (e.g., determined at 704 of FIG. 7), an expected signal that would result if a touch contact was received at the contact location(s) of the hypothesis set is determined for each detected signal and for each touch contact location of the hypothesis set. In some embodiments, determining the expected signal includes using a function and one or more function coefficients to generate/simulate the expected signal. The function and/or one or more function coefficients may be predetermined and/or dynamically determined (e.g., determined based on one or more provided touch contact locations). In some embodiments, the function and/or one or more function coefficients may be determined/selected specifically for a particular transmitter and/or sensor of a detected signal. For example, the expected signal is to be compared to a detected signal and the expected signal is generated using a function coefficient determined specifically for the pair of transmitter and sensor of the detected signal. In some embodiments, the function and/or one or more function coefficients may be dynamically determined.

In some embodiments, in the event the hypothesis set includes more than one touch contact location (e.g., multi-touch input), expected signal for each individual touch contact location is determined separately and combined together. For example, an expected signal that would result if a touch contact was provided at a single touch contact location is added with other single touch contact expected signals (e.g., effects from multiple simultaneous touch contacts add linearly) to generate a single expected signal that would result if the touch contacts of the added signals were provided simultaneously.

In some embodiments, the expected signal for a single touch contact is modeled as the function:

$$C*P(x-d)$$

where C is a function coefficient (e.g., complex coefficient) and P(x) is a function and d is the total path distance between a transmitter (e.g., transmitter of a signal desired to be simulated) to a touch input location and between the touch input location and a sensor (e.g., receiver of the signal desired to be simulated).

In some embodiments, the expected signal for one or more touch contacts is modeled as the function:

$$\Sigma_{j=1}^{N} C_j P(x-d_j)$$

where j indicates which touch contact and N is the number of total simultaneous touch contacts being modeled (e.g., hypothesis number determined at 702 of FIG. 7).

At 804, corresponding detected signals are compared with corresponding expected signals. In some embodiments, the detected signals include spatial domain signals determined at 508 of FIG. 5. In some embodiments, comparing the signals includes determining a mean square error between the signals. In some embodiments, comparing the signals includes determining a cost function that indicates the similarity/difference between the signals. In some embodiments, the cost function for a hypothesis set (e.g., hypothesis set determined at 704 of FIG. 7) analyzed for a single transmitter/sensor pair is modeled as:

$$\varepsilon(r_x, t_x) = |q(x) - \Sigma_{j=1}^{N} C_j P(x-d_j)|^2$$

where $\varepsilon(r_x, t_x)$ is the cost function, $q(x)$ is the detected signal, and $\Sigma_{j=1}^{N} C_j P(x-d_j)$ is the expected signal. In some embodiments, the global cost function for a hypothesis set analyzed for more than one (e.g., all) transmitter/sensor pairs is modeled as:

$$\varepsilon = \Sigma_{i=1}^{Z} \varepsilon(r_x, t_x)_i$$

where $\varepsilon$ is the global cost function, Z is the number of total transmitter/sensor pairs, i indicates the particular transmitter/sensor pair, and $\varepsilon(r_x, t_x)_i$ is the cost function of the particular transmitter/sensor pair.

At 806, a selected hypothesis set of touch contact location(s) is selected among the one or more hypothesis sets of touch contact location(s) as best corresponding to detected signal(s). In some embodiments, the selected hypothesis set is selected among hypothesis sets determined at 704 or 710 of FIG. 7. In some embodiments, selecting the selected hypothesis set includes determining the global cost function (e.g., function $\varepsilon$ described above) for each hypothesis set in the group of hypothesis sets and selecting the hypothesis set that results in the smallest global cost function value.

Figure 9:
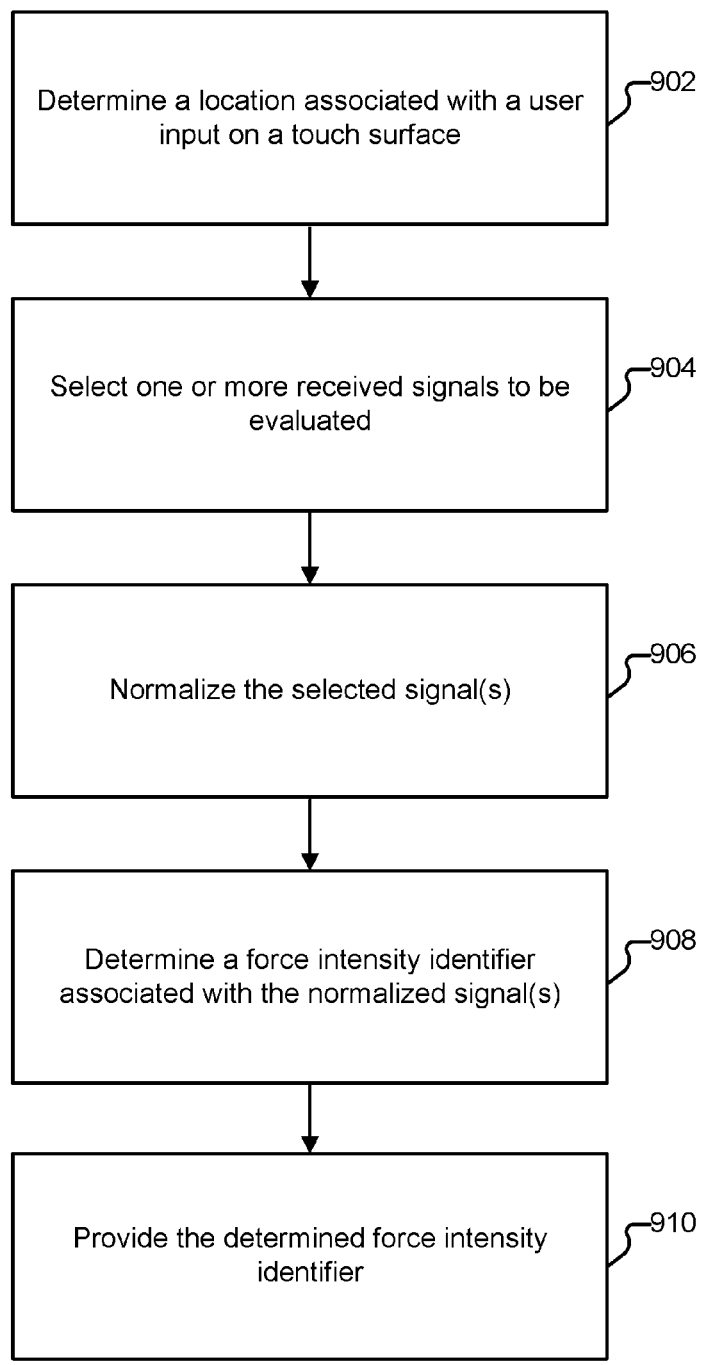
FIG. 9 is a flowchart illustrating an embodiment of a process of determining a force associated with a user input.

FIG. 9 is a flowchart illustrating an embodiment of a process of determining a force associated with a user input. The process of FIG. 9 may be implemented on touch detector 120 of FIG. 1 and/or touch detector 302 of FIG. 3.

At 902, a location associated with a user input on a touch input surface is determined. In some embodiments, at least a portion of the process of FIG. 4 is included in step 702. For example, the process of FIG. 9 is used to determine a location associated with a user touch input. In another example, a location associated with a user input on a surface of medium 102 of FIG. 1 is determined.

At 904, one or more received signals are selected to be evaluated. In some embodiments, selecting the signal(s) to be evaluated includes selecting one or more desired signals from a plurality of received signals used to detect the location associated with the user input. For example, one or more signals received in step 404 of FIG. 4 are selected. In some embodiments, the selected signal(s) are selected based at least in part on a signal-to-noise ratio associated with signals. In some embodiments, one or more signals with the highest signal-to-noise ratio are selected. For example, when an active signal that is propagated through a touch input surface medium is disturbed/scattered by a touch input, the disturbed signal is detected/received at various detectors/sensors/receivers coupled to the medium. The received disturbed signals may be subject to other undesirable disturbances such as other minor vibration sources (e.g., due to external audio vibration, device movement, etc.) that also disturb the active signal. The effects of these undesirable disturbances may be larger on received signals that were received further away from the location of the touch input.

In some embodiments, a variation (e.g., disturbance such as amplitude change) detected in an active signal received at a receiver/sensor may be greater at certain receivers (e.g., receivers located closest to the location of the touch input) as compared to other receivers. For example, in the example of FIG. 1, touch input on disturbs an active signal sent by transmitter 104. The disturbed active signal is received at receivers 111-118. Because one receiver may be located closer to the touch input location as compared to another receiver, it has received a disturbed signal with the largest amplitude variation that is proportional to the force of the touch input. In some embodiments, the selected signals may have been selected at least in part by examining the amplitude of a detected disturbance. For example, one or more signals with the highest amplitude associated with a detected touch input disturbance are selected. In some embodiments, based at least in part on a determined location, one or more signals received at one or more receivers located closest to the touch input location are selected. In some embodiments, a plurality of active signals is used to detect a touch input location and/or touch input force intensity. One or more received signals to be used to determine a force intensity may be selected for each of the active signals. In some embodiments, one or more received signals to be used to determine the force intensity may be selected across the received signals of all the active signals.

At 906, the one or more selected signals are normalized. In some embodiments, normalizing a selected signal includes adjusting (e.g., scaling) an amplitude of the selected signal based on a distance value associated with the selected signal. For example, although an amount/intensity of force of a touch input may be detected by measuring an amplitude of a received active signal that has been disturbed by the force of the touch input, other factors such as the location of the touch input with respect to a receiver that has received the disturbed signal and/or location of the transmitter transmitting the active signal may also affect the amplitude of the received signal used to determine the intensity of the force. In some embodiments, a distance value/identifier associated with one or more of the following is used to determine a scaling factor used to scale a selected signal: a distance between a location of a touch input and a location of a receiver that has received the selected signal, a distance between a location of a touch input and a location of a transmitter that has transmitted an active signal that has been disturbed by a touch input and received as the selected signal, a distance between a location of a receiver that has received the selected signal and a location of a transmitter that has transmitted an active signal that has been disturbed by a touch input and received as the selected signal, and a combined distance of a first distance between a location of a touch input and a location of a receiver that has received the selected signal and a second distance between the location of the touch input and a location of a transmitter that has transmitted an active signal that has been disturbed by a touch input and received as the selected signal. In some embodiments, each of one or more selected signals is normalized by a different amount (e.g., different amplitude scaling factors).

At 908, a force intensity identifier associated with the one or more normalized signals is determined. The force intensity identifier may include a numerical value and/or other identifier identifying a force intensity. In some embodiments, if a plurality of normalized signals is used, an associated force may be determined for each normalized signal and the determined forces may be averaged and/or weighted-averaged to determine the amount of the force. For example, in the case of weighted averaging of the force values, each determined force value is weighted based on an associated signal-to-noise ratio, an associated amplitude value, and/or an associated distance value between a receiver of the normalized signal and the location of the touch input.

In some embodiments, the amount of force is determined using a measured amplitude associated with a disturbed portion of the normalized signal. For example, the normalized signal represents a received active signal that has been disturbed when a touch input was provided on a surface of a medium that was propagating the active signal. A reference signal may indicate a reference amplitude of a received active signal if the active signal was not disturbed by a touch input. In some embodiments, an amplitude value associated with an amplitude change to the normalized signal caused by a force intensity of a touch input is determined. For example, the amplitude value may be a measured amplitude of a disturbance detected in a normalized signal or a difference between a reference amplitude and the measured amplitude of the disturbance detected in the normalized signal. In some embodiments, the amplitude value is used to obtain an amount/intensity of a force.

In some embodiments, the use of the amplitude value includes using the amplitude value to look up in a data structure (e.g., table, database, chart, graph, lookup table, list, etc.) a corresponding associated force intensity. For example, the data structure includes entries associating a signal disturbance amplitude value and a corresponding force intensity identifier. The data structure may be predetermined/pre-computed. For example, for a given device, a controlled amount of force is applied and the disturbance effect on an active signal due to the controlled amount of force is measured to determine an entry for the data structure. The force intensity may be varied to determine other entries of the data structure. In some embodiments, the data structure is associated with a specific receiver that received the signal included in the normalized signal. For example, the data structure includes data that has been specifically determined for characteristics of a specific receiver (e.g., for sensor/receiver 114 of FIG. 1). In some embodiments, the use of the amplitude value to look up a corresponding force intensity identifier stored in a data structure includes selecting a specific data structure and/or a specific portion of a data structure corresponding to the normalized signal and/or a receiver that received the signal included in the normalized signal. In some embodiments, the data structure is associated with a plurality of receivers. For example, the data structure includes entries associated with averages of data determined for characteristics of each receiver in the plurality of receivers. In this example, the same data structure may be used for a plurality of normalized signals associated with various receivers.

In some embodiments, the use of the amplitude value includes using the amplitude value in a formula that can be used to simulate and/or calculate a corresponding force intensity. For example, the amplitude value is used as an input to a predetermined formula used to compute a corresponding force intensity. In some embodiments, the formula is associated with a specific receiver that received the signal of the normalized signal. For example, the formula includes one or more parameters (e.g., coefficients) that have been specifically determined for characteristics of a specific receiver (e.g., for sensor/receiver 114 of FIG. 1). In some embodiments, the use of the amplitude value in a formula calculation includes selecting a specific formula corresponding to the normalized signal and/or a receiver that received the signal included in the normalized signal. In some embodiments, a single formula is associated with a plurality of receivers. For example, a formula includes averaged parameter values of parameter values that have been specifically determined for characteristics for each of the receivers in the plurality of receivers. In this example, the same formula may be used for a plurality of normalized signals associated with different receivers.

At 910, the determined force intensity identifier is provided. In some embodiments, providing the force intensity identifier includes providing the identifier (e.g., a numerical value, an identifier within a scale, etc.) to an application such as an application of application system 122 of FIG. 1. In some embodiments, the provided force intensity identifier is provided with a corresponding touch input location identifier determined in step 406 of FIG. 4. In some embodiments, the provided force intensity identifier is used to provide a user interface interaction.

In some embodiments, the touch input detection described in conjunction with FIGS. 4-9 relate a touch input from a passive (i.e., not actively generating a signal) touch source (e.g., finger) that disturbs an active signal propagating through a touch input medium while the touch input detection described in conjunction with FIGS. 10-15 relate to a touch input from a signal generating touch source (e.g., touch input indicator device 202 of FIG. 2).

Figure 10:
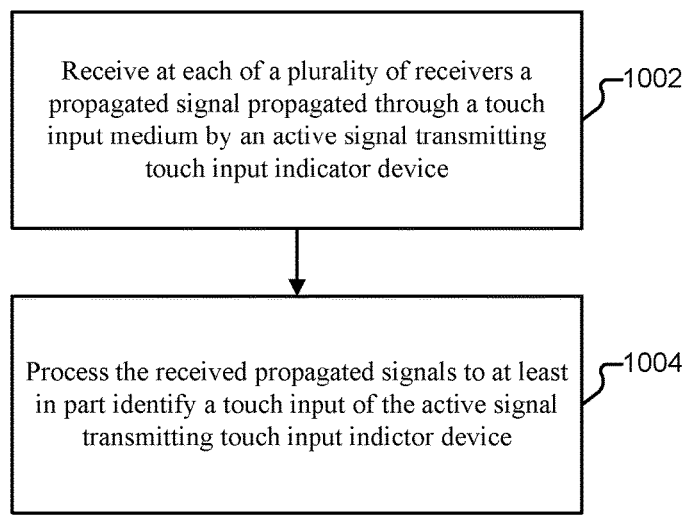
FIG. 10 is a flowchart illustrating an embodiment of a process for determining a location associated with a touch input from a touch input indicator device.

FIG. 10 is a flowchart illustrating an embodiment of a process for determining a location associated with a touch input from a touch input indicator device. The process of FIG. 10 may be implemented on touch detector 120 of FIG. 1 and/or touch detector 302 of FIG. 3. In some embodiments, the process of FIG. 10 is utilized to detect a touch input provided by touch input indicator device 124 of FIG. 1 and/or stylus device 202 of FIG. 2.

At 1002, an active touch input source signal propagated through a touch input medium by an active signal transmitting touch input indicator device is received at each of a plurality of receivers (e.g., sensors) as a received propagated signal for the specific receiver. For example, a user provides a touch input using touch input indicator device 124 of FIG. 1 and/or device 202 of FIG. 2 on to a touch input surface of the touch input medium (e.g., medium 102 of FIG. 1) by contacting a tip of the touch input indicator device on to a desired location on the touch input surface. The touch input may be a part of a gesture, a user interface indication, a drawing input, or any other interaction with a touch input surface. The tip of the touch input indicator device is vibrating at a frequency and amplitude of the touch input source signal outputted by a transmitter of the touch input indicator device. When the touch input indicator device contacts the touch input surface, the tip of the device impacts and vibrates the propagating medium at its contact location to propagate the touch input source signal from the contact location to locations throughout the touch input medium. The propagated signal originating from the same source signal is received at the various receivers at different times due to the difference in location of the receivers. As the propagating signal propagates through the touch input medium, the propagating signal eventually reaches receivers coupled to the propagating medium (e.g., receivers 111-118 of FIG. 1). A receiver that is closer to the touch input contact location will receive the propagated signal sooner than another receiver that is further away from the touch input contact location and based on received signal time differences at various receivers, the location of the touch input contact location that is the source of the propagated signal may be determined.

The touch input source signal may encode data identifying the touch input indicator device and/or a type of touch input to allow differentiation between different devices and touch input types. For example, a touch input provided by a signal transmitting touch input indicator device is differentially handled differently from a touch input provided by a non-transmitting touch input (e.g., finger) in a drawing application (e.g., only register the touch input provided by an active signal transmitting touch input indicator device as a drawing pen input). In some embodiments, the touch input source signal propagated by the signal transmitting touch input indicator device is communicated in a different communication channel from signals transmitted by transmitters utilized in signal disturbance detection-based touch input detection (e.g., signals transmitted by transmitters 104, 106, 108 and 110 of FIG. 1 and transmitters 204 and/or 208 of FIG. 2). For example, the signals transmitted/propagated by the touch input indicator device are transmitted at a different frequency range from the signals transmitted by transmitters fixed to the touch input medium. In this case, the propagated signal received in 1002 has been obtained from initial signals received at the receivers by filtering for the specific frequencies associated with the propagated signals of the touch input indicator device.

In some embodiments, the group of propagated signals received in 1002 for a common source signal is one of a plurality of different groups of propagated signals for a plurality of different source signals of different touch input indicator devices. For example, a multi-user touch input surface allows simultaneous inputs from a plurality of different stylus devices and each stylus transmits and propagates a different signal to a touch input medium to be able to distinguish one stylus from another stylus. Each distinct propagated signal may be separated from one another to identify the individual touch input for each different touch input indicator device interacting with the touch input surface. This may include filtering and/or signal processing to separate the different propagated signals from one another. For example, a phase of the signals (e.g., code division multiplexing), a frequency range of the signals (e.g., frequency division multiplexing), content of the signals (e.g., different PRBS content), or a timing of the signals (e.g., time division multiplexing) may be varied among signals of different touch input indicator devices. In various embodiments, the touch input source signal outputted by a touch input indicator device may be varied to indicate a different setting/property or selected input type of the touch input indicator device.

In some embodiments, receivers fixed to the touch input medium are listening for any propagated signals from the touch input source signal of a touch input indicator device and the process of FIG. 10 is initiated when the touch input source signal of a touch input indicator device is detected. For example, a received signal is analyzed to determine whether any propagated signal of a touch input source signal is detected in the received signal (e.g., signal of at least a threshold amplitude in a set frequency range detected) and only in the event a propagated touch input source signal has been detected does the process proceed to 1004.

At 1004, the received propagated signals are processed to at least in part identify a touch input of the active signal transmitting touch input indictor device. In some embodiments, the received propagated signals are processed to determine a source location of the propagated signals of the same source signal. For example, time differences between the received propagated signals of the same source signal are compared to identify the originating location on the touch input medium. In some embodiments, a force associated with the touch input is determined. In some embodiments, an orientation angle of the touch input indicator device when the touch input indicator device provided the touch input is determined.

In some embodiments, the process of FIG. 10 is repeated for each different source touch input source signal that has been propagated. For example, multiple stylus devices are able to be utilized simultaneously to provide simultaneous touch inputs on the same touch input surface and each different stylus device propagates different touch input source signals that are separately processed to detect the touch input of each individual stylus touch input indicator device.

Figure 11:
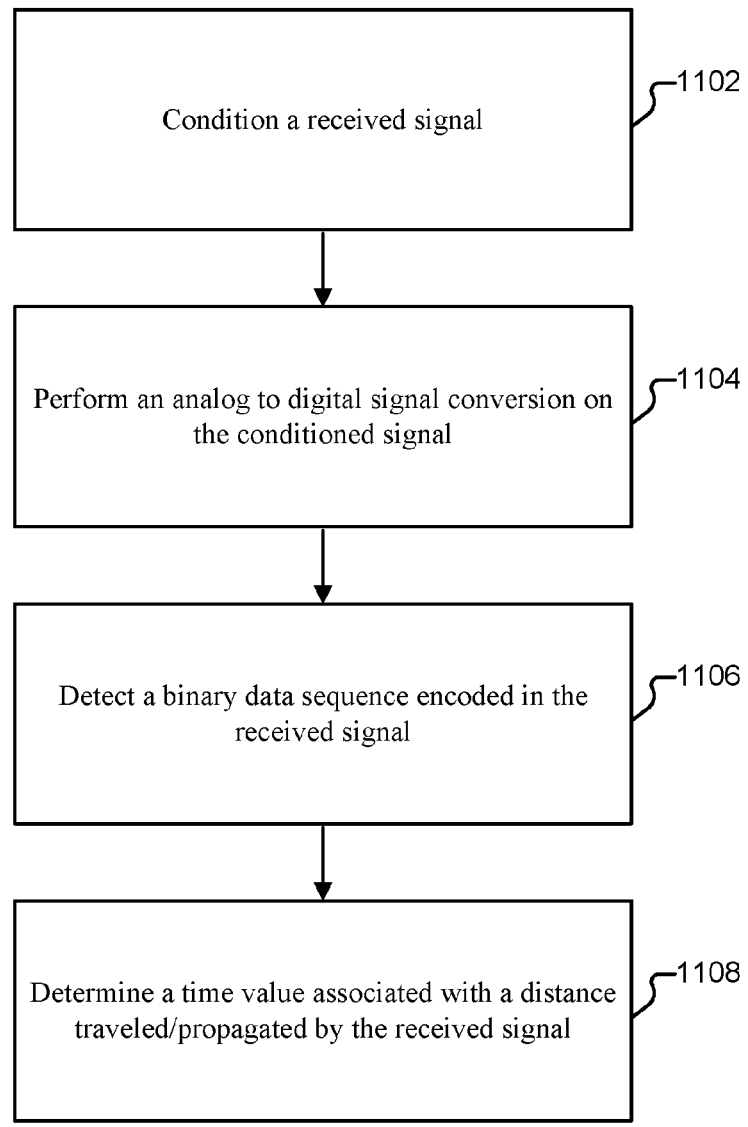
FIG. 11 is a flowchart illustrating an embodiment of a process for detecting a time value associated with a distance traveled by a propagated signal.

FIG. 11 is a flowchart illustrating an embodiment of a process for detecting a time value associated with a distance traveled by a propagated signal. For example, the process of FIG. 11 is utilized to detect a time value associated with a propagated signal of an active signal transmitted by a touch input indicator device. The process of FIG. 11 may be implemented on touch detector 120 of FIG. 1 and/or touch detector 302 of FIG. 3. In some embodiments, the process of FIG. 11 is utilized to process a propagated signal of a touch input provided by device 124 of FIG. 1 and/or device 202 of FIG. 2. In some embodiments, at least a portion of the process of FIG. 11 is included in 1002 and/or 1004 of FIG. 10. In some embodiments, process of FIG. 11 is periodically and/or dynamically repeated to process each new received signal.

At 1102, a received signal is conditioned. In some embodiments, the received signal is a received signal at any of receivers/sensors 111-118 of FIG. 1. In some embodiments, conditioning the signal includes filtering the signal to obtain signal in a frequency range of interest. For example, the received signal is frequency bandpass filtered to obtain signals within a frequency range of active touch input source signals transmitted/propagated by a touch input indicator device (e.g., by device 124 or device 202 of FIGS. 1 and 2). This may allow only signals in the frequency communication channel reserved for touch input indicator devices to be isolated. In some embodiments, conditioning the signal includes filtering or otherwise modifying the received signal to improve signal quality (e.g., signal-to-noise ratio) for detection of a pseudorandom binary sequence (PRBS) potentially included in the received signal. In some embodiments, conditioning the received signal includes filtering out from the signal extraneous noise and/or vibrations not likely associated with a user touch indication.

At 1104, an analog to digital signal conversion is performed on the conditioned signal. In various embodiments, any number of standard analog to digital signal converters may be used.

At 1106, a binary data sequence encoded in the received signal is detected. In some embodiments, if the binary data sequence is not detected, the process ends. In some embodiments, the binary data sequence encoded in the received signal is one of a plurality of possible/eligible binary data sequences. For example, there exists a predetermined list of binary data sequences that are able to be detected and the digital signal is processed and tested to determine whether the received signal encodes any of the candidate binary data sequences. In some embodiments, the binary data sequence is a PRBS among a plurality of candidate PRBSs. In some embodiments, detecting the binary data sequence allows detection and confirmation that a signal propagated by a touch input indicator device was received to initiate detection of a location/force of a provided touch input. The values of the detected binary sequence may indicate a type of touch input and/or which touch input indicator device provided a touch input. In some embodiments, detecting the binary sequence includes correlating the signal. For example, the received signal (e.g., signal resulting from 1104) is correlated to locate a binary data sequence in the converted signal (e.g., perform pseudorandom binary sequence deconvolution). In some embodiments, the signal is correlated with one or more reference signals (e.g., ideal signals for each candidate binary sequence). In some embodiments, autocorrelation is performed to identify patterns and location of the binary sequence within the received signal.

At 1108, a time value associated with a distance traveled/propagated by the received signal is determined. For example, when a touch input indicator device contacts a touch input surface, the signal outputted by the touch input indictor device travels from the device at the contact location to a receiver and the amount of time it takes for this travel is a function of the distance between the contact location and the location of the receiver. In some embodiments, using the correlation data of 1106, the location/delay of the received signal of the binary data sequence data with respect to a reference location/time is determined and utilized to determine the determined time value (e.g., time delay value of the received signal). In some embodiments, the time value is relative to other time values associated with the binary sequence detected at other receivers.

Figure 12:
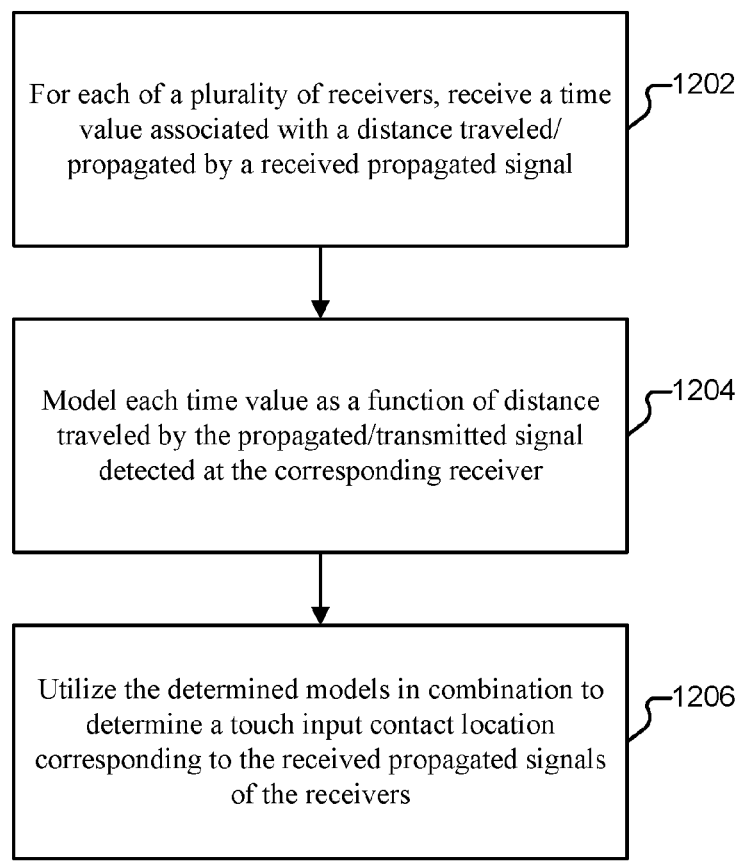
FIG. 12 is a flowchart illustrating an embodiment of a process for detecting a touch input location corresponding to a source of a propagated signal.

FIG. 12 is a flowchart illustrating an embodiment of a process for detecting a touch input location corresponding to a source of a propagated signal. For example, the process of FIG. 12 is utilized to detect a touch input location of a touch input indicator device. The process of FIG. 12 may be implemented on touch detector 120 of FIG. 1 and/or touch detector 302 of FIG. 3. In some embodiments, the process of FIG. 12 is utilized to detect a location of a touch input provided by device 124 of FIG. 1 and/or device 202 of FIG. 2. In some embodiments, at least a portion of the process of FIG. 12 is included in 1004 of FIG. 10. In some embodiments, the process of FIG. 12 is periodically and/or dynamically repeated to process each updated received propagated signal.

At 1202, a time value associated with a distance traveled/propagated by a received propagated signal is received for each of a plurality of receivers. For example, the time value determined in 1108 of FIG. 11 for each receiver (e.g., each of receivers 111-118 of FIG. 1) fixed to a touch input medium is received. In some embodiments, the time value is a measured time value of when a signal from a touch input indicator device propagated through a propagating medium is detected/received at a receiver. In some embodiments, the time values are relative to a common reference. In some embodiments, the time values are relative to each other and identify relative differences from one another rather than an absolute time value.

At 1204, each time value is modeled as a function of distance traveled by the propagated/transmitted signal detected at the corresponding receiver. For example, speed of propagation through a propagating medium of the signal is known and each time value of each receiver is expressed as a function of the speed of propagation and a variable distance traveled. In some embodiments, not only does the propagated/transmitted signal travel through the propagating medium (e.g., medium 102 of FIG. 1), the signal has to travel through a material of a tip of a touch input indicator device coupled to its transmitter. The source of the signal transmitted by the transmitter of the touch input indicator device may be modeled as originating from a center of the transmitter and the distance between the center of the transmitter and the contact location of the tip with the touch input surface represents the distance traveled in the tip material (e.g., material of tip 206 of FIG. 2). For example, each time value may be modeled as:

> Time value=$f$((distance of propagation through touch input medium)/(speed of propagation through touch input medium)+(distance of propagation through contact tip medium)/(speed of propagation through contact tip medium)).

The distance traveled by the signal through the propagating medium may be represented as a function of a location coordinate of the source touch input contact location on the touch input surface given the known location of the corresponding receiver of each time value. For example, each time value may be now modeled as:

> Time value=$f$((distance between the touch contact location and the location of corresponding receiver expressed as a function of touch contact location coordinate variables (e.g., coordinate variables $x,y$))/(speed of propagation through touch input medium)+(distance of propagation through contact tip medium)/(speed of propagation through contact tip medium)).

At 1206, determined models are utilized in combination to determine a touch input contact location corresponding to the received propagated signals of the receivers. In some embodiments, the determined models are represented as equations and the equations are solved to determine a location coordinate of the touch input contact location. For example, given the example equation described along with 1204, the only unknown values of the equations are the touch contact location coordinate and the distance of propagating through the contact tip medium. Given enough equations with the same unknowns, they are solved together to determine the unknown variables.

Figure 13:
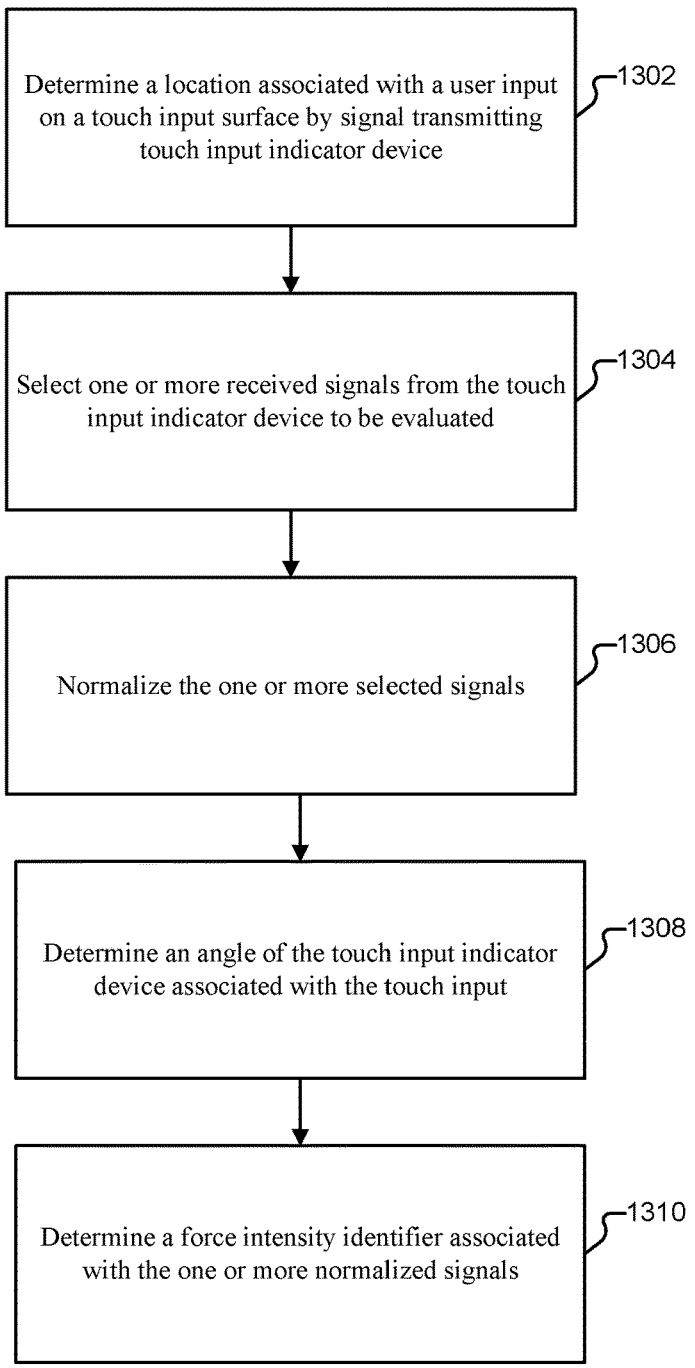
FIG. 13 is a flowchart illustrating an embodiment of a process for detecting a force corresponding to a touch input provided using a touch input indicator device.

FIG. 13 is a flowchart illustrating an embodiment of a process for detecting a force corresponding to a touch input provided using a touch input indicator device. The process of FIG. 13 may be implemented on touch detector 120 of FIG. 1 and/or touch detector 302 of FIG. 3. In some embodiments, the process of FIG. 13 is utilized to detect a touch input force of a touch input provided by device 124 of FIG. 1 and/or device 202 of FIG. 2. In some embodiments, at least a portion of the process of FIG. 13 is included in 1004 of FIG. 10. In some embodiments, the process of FIG. 13 is periodically and/or dynamically repeated to process each updated received propagated signal.

At 1302, a location associated with a user input on a touch input surface by signal transmitting touch input indicator device is determined. For example, the touch location determined in 1206 is received.

At 1304, one or more received signals from the touch input indicator device are selected to be evaluated. In some embodiments, selecting the signal(s) to be evaluated include selecting one or more desired signals from a plurality of received signals used to detect the location associated with the user input. For example, one or more signals received in step 1002 of FIG. 10 are selected. In some embodiments, the selected signal(s) are selected based at least in part on a signal-to-noise ratio associated with signals. In some embodiments, one or more signals with the highest signal-to-noise ratio are selected. For example, the received signals may be subject to undesirable disturbances such as other minor vibration sources (e.g., due to external audio vibration, device movement, etc.). The effects of these undesirable disturbances may be larger on received signals that were received further away from the location of the touch input.

In some embodiments, a variation (e.g., disturbance such as amplitude change) detected in a signal received at a receiver/sensor may be greater at certain receivers (e.g., receivers located closest to the location of the touch input) as compared to other receivers. Because one receiver may be located closer to the touch input location as compared to another receiver, it has received a disturbed signal with the largest amplitude variation that is proportional to the force of the touch input. In some embodiments, the selected signals may have been selected at least in part by examining the amplitude of the received signal. For example, one or more received signals with the highest amplitude are selected. In some embodiments, based at least in part on a determined location, one or more signals received at one or more receivers located closest to the touch input location are selected. In some embodiments, a plurality of active signals is used to detect a touch input location and/or touch input force intensity. One or more received signals to be used to determine a force intensity may be selected for each of the active signals.

At 1306, the one or more selected signals are normalized. In some embodiments, normalizing a selected signal includes adjusting (e.g., scaling) an amplitude of the selected signal based on a distance value associated with the selected signal. For example, although an amount/intensity of force of a touch input may be detected by measuring an amplitude of a received active signal that has been disturbed by the force of the touch input, other factors such as the location of the touch input with respect to a receiver that has received the disturbed signal and/or location of the transmitter transmitting the active signal may also affect the amplitude of the received signal used to determine the intensity of the force. In some embodiments, a distance value/identifier associated with a distance between the touch input location and the corresponding receiver is used to determine a scaling factor used to scale a selected signal. In some embodiments, each of one or more selected signals is normalized by a different amount (e.g., different amplitude scaling factors).

At 1308, an angle of the touch input indicator device when the touch input device provided the touch input is determined. For example, when a user pushes the touch input indicator device using a force, the user typically pushes the touch input indicator device in the direction of the length of the touch input indicator device. If the touch input indicator device contacts the touch input surface at an angle less than 90 degrees with respect to the plane of the touch input device, the downward normal force on the surface of the touch input surface is only a portion of the force applied on the touch input indicator device in the angled direction. For example, the applied force includes both a downwards component and a sideways component. Once the angle of the touch input indicator device contact is determined, the value of the total force applied on the touch input indicator device may be calculated. In some embodiments, the angle of the touch input is determined using the distance of propagation through the contact tip medium determined in 1206 of FIG. 12.

At 1310, a force intensity identifier associated with the one or more normalized signals is determined. The force intensity identifier may include a numerical value and/or other identifier identifying a force intensity. In some embodiments, if a plurality of normalized signals is used, an associated force may be determined for each normalized signal and the determined forces may be averaged and/or weighted-averaged to determine the amount of the force. For example, in the case of weighted averaging of the force values, each determined force value is weighted based on an associated signal-to-noise ratio, an associated amplitude value, and/or an associated distance value between a receiver of the normalized signal and the location of the touch input.

In some embodiments, the amount of force is determined using a measured amplitude associated with the normalized signal. For example, a larger force corresponds to a larger transferred energy from the vibration of the tip of the touch input indicator device and the amplitude of propagated signal from the touch input indicator device proportionally increases. The amplitude value may be a function of a measured amplitude of the propagated signal and a maximum and/or average amplitude value is used to obtain an amount/intensity of a force.

In some embodiments, the use of the amplitude value includes using the amplitude value to look up in a data structure (e.g., table, database, chart, graph, lookup table, list, etc.) a corresponding associated force intensity. For example, the data structure includes entries associating an amplitude value and a corresponding force intensity identifier. The data structure may be predetermined/pre-computed. In some embodiments, the data structure is associated with a specific receiver that received the signal included in the normalized signal. For example, the data structure includes data that has been specifically determined for characteristics of a specific receiver (e.g., for receiver 111 of FIG. 1). In some embodiments, the use of the amplitude value to look up a corresponding force intensity identifier stored in a data structure includes selecting a specific data structure and/or a specific portion of a data structure corresponding to the normalized signal and/or a receiver that received the signal included in the normalized signal. In some embodiments, the data structure is associated with a plurality of receivers. For example, the data structure includes entries associated with averages of data determined for characteristics of each receiver in the plurality of receivers. In this example, the same data structure may be used for a plurality of normalized signals associated with various receivers.

In some embodiments, the use of the amplitude value includes using the amplitude value in a formula that can be used to simulate and/or calculate a corresponding force intensity. For example, the amplitude value is used as an input to a predetermined formula used to compute a corresponding force intensity. In some embodiments, the formula is associated with a specific receiver that received the signal of the normalized signal. For example, the formula includes one or more parameters (e.g., coefficients) that have been specifically determined for characteristics of a specific receiver (e.g., for receiver 111 of FIG. 1). In some embodiments, the use of the amplitude value in a formula calculation includes selecting a specific formula corresponding to the normalized signal and/or a receiver that received the signal included in the normalized signal. In some embodiments, a single formula is associated with a plurality of receivers. For example, a formula includes averaged parameter values of parameter values that have been specifically determined for characteristics for each of the receivers in the plurality of receivers. In this example, the same formula may be used for a plurality of normalized signals associated with different receivers.

In some embodiments, the force intensity identifier has been scaled with respect to the detected angle of the touch input indicator device. For example, the data structure and/or the formula utilizes and accounts for different detected angles. In some embodiments, based on the determined angle and the determined downward normal force, the total force in the direction of the angle pointed by the touch input indicator device is trigonometrically calculated as the force intensity identifier.

Figure 14:
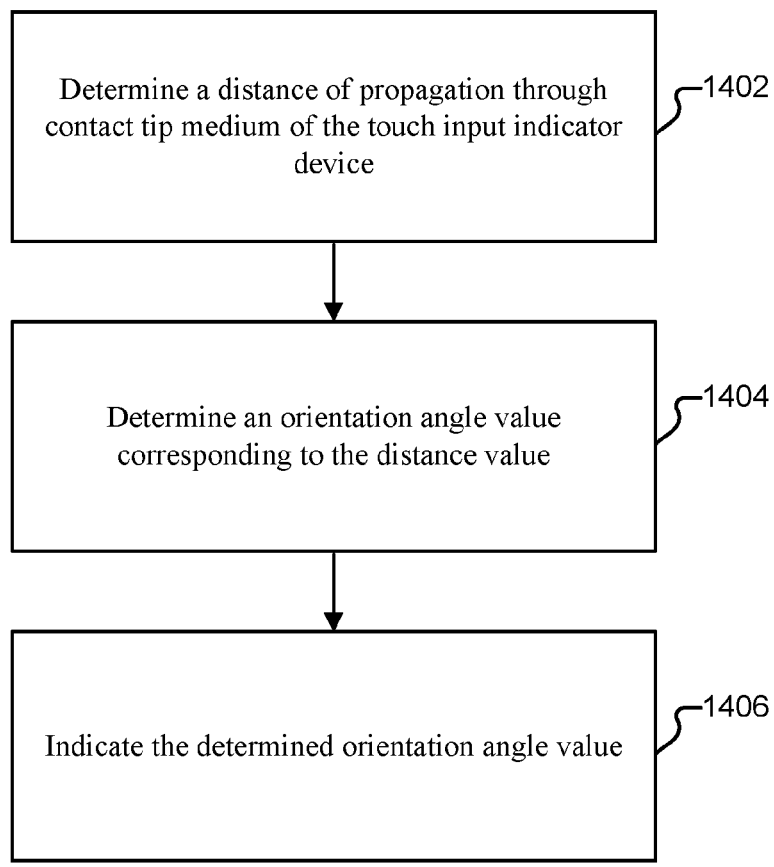
FIG. 14 is a flowchart illustrating an embodiment of a process for detecting an angle of a touch input provided using a touch input indicator device.

FIG. 14 is a flowchart illustrating an embodiment of a process for detecting an angle of a touch input provided using a touch input indicator device. The process of FIG. 14 may be implemented on touch detector 120 of FIG. 1 and/or touch detector 302 of FIG. 3. In some embodiments, the process of FIG. 14 is utilized to detect an orientation angle of device 124 of FIG. 1 and/or device 202 of FIG. 2 when the device provided a touch input. In some embodiments, at least a portion of the process of FIG. 14 is included in 1308 of FIG. 13.

At 1402, a distance of propagation through the contact tip medium of the touch input indicator device is determined. For example, the distance value calculated in 1206 of FIG. 12.

At 1404, an orientation angle value (e.g., with respect to a horizontal plane of the touch input surface) corresponding to the distance value is determined. For example, a formula and/or a chart that maps the distance value to the angle value is utilized to determine the orientation angle. In some embodiments, determining the orientation angle value includes identifying the tip that was utilized to contact the touch input surface and utilizing the chart/formula corresponding to the identified tip. The tip may be identified based on a received propagated signal (e.g., PRBS signal encoded in the signal and/or other encoded data indicates the device/tip utilized). Each different distance value may uniquely correspond to a different angle value because the shape of the tip (e.g., an elongated half spheroid shape) is such that the distance between the center of the transmitter coupled to the tip and the center of the location on the surface of the tip contacting the touch input surface varies uniquely at different orientation angles of the touch input indicator device with respect to the plane of the touch input surface. For example, the distance of propagation through the contact tip medium decreases proportionally as the angle value is decreased for an elongated half spheroid shaped tip. In another example, the distance of propagation through the contact tip medium increases proportionally as the angle value is decreased for half of a shortened half spheroid shaped tip.

At 1406, the determined orientation angle value is indicated. In some embodiments, the indicated orientation angle value is utilized to determine a force associated with a touch input (e.g., in 1310 of FIG. 13). In some embodiments, the determined orientation angle value is provided for use by an application (e.g., provided to application system 122 of FIG. 1). For example, the angle value is utilized in a drawing/sketching application to adjust a thickness and/or angle of a line to be drawn at an indicated touch input location. In order to simulate a writing instrument (e.g., calligraphy pen) that marks different lines of widths depending on the orientation angle of the writing instrument, the determined orientation angle value is utilized to control the variation in indicated thickness of the mark to be made at the indicated touch input location of the touch input indicator device.

Figure 15:
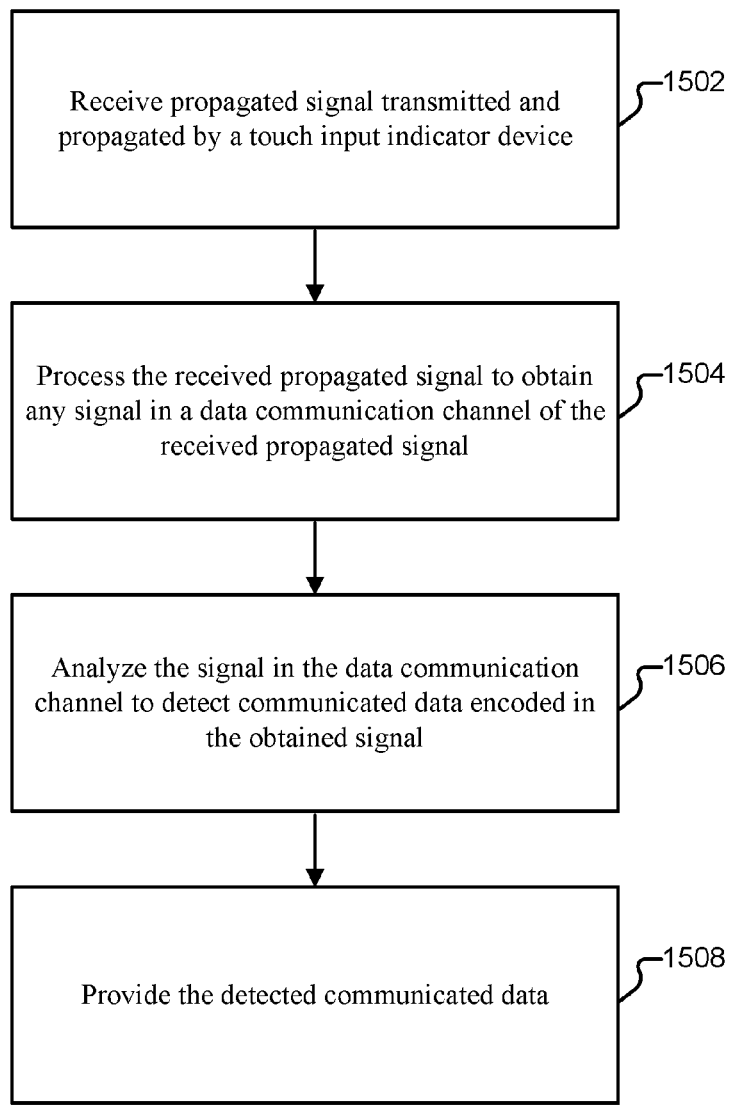
FIG. 15 is a flowchart illustrating an embodiment of a process for communicating data from a touch input indicator device to a touch input receiving device.

FIG. 15 is a flowchart illustrating an embodiment of a process for communicating data from a touch input indicator device to a touch input receiving device. The process of FIG. 15 may be implemented on touch detector 120 of FIG. 1 and/or touch detector 302 of FIG. 3. For example, it may be desirable to establish data communication from touch input indicator device 124 of FIG. 1 to a computer receiving a touch input from touch input indicator device 124. Data such as touch input type, setting, property, and/or option may need to be communicated to the touch input receiving computer to allow the touch input receiving computer to utilize the provided information to provide different application functionality based on the information. One option is to physically connect the touch input indicator device to the receiving computer using a wire. However, the wire may undesirably restrict the movement of the touch input indicator device. Another option is using a wireless radio to communicate the information. However, including a wireless radio in the touch input indicator device may be prohibitively expensive and may consume too much power.

At 1502, propagated signal transmitted and propagated by a touch input indicator device is received. For example, signal transmitted by device 124 of FIG. 1 and/or 202 of FIG. 202 propagated through a propagating medium is received at a receiver (e.g., one of receivers 111-118 of FIG. 1) coupled to the propagating medium.

At 1504, the received propagated signal is processed to obtain any signal in a data communication channel of the received propagated signal. For example, in addition to transmitting an ultrasonic signal with PRBS data utilized to identify the location, force, and/or angle of a touch input (e.g., identified in 1004 of FIG. 10), the touch input indicator device also drives its tip to propagate a signal component that encodes touch input type/property data to be communicated. In some embodiments, the communicated data may include one or more identifiers of a touch input color (e.g., selected using button 212 of FIG. 2), touch input line width, touch input tip type (e.g., detected using switch 220 of FIG. 2), touch input force (e.g., detected using strain gauge included in the touch input indicator device), touch input angle (e.g., detected using gyroscope included in the touch input indicator device), and any other touch input type, setting, or option. This communicated information may also be propagated ultrasonically and detected at the receiving device in 1502 at receivers (e.g., receivers 111-118 of FIG. 1). The data communication channel may be one of a plurality of different data channels (e.g., all communicated ultrasonically). For example, one channel may include signals from transmitters 104-110 of FIG. 1, another channel includes signals from signal transmitting touch input indicator devices (e.g., device 124 of FIG. 1), and another channel is the data communication channel including signals encoding the touch input type/property/option information. The different channels may be established by varying one or more of the following: a phase of the signals (e.g., code division multiplexing), a frequency range of the signals (e.g., frequency division multiplexing), or a timing of the signals (e.g., time division multiplexing). In some embodiments, processing the received propagated signal includes bandpass filtering the received propagated signal to obtain signals in the frequency range of the data communication channel.

At 1506, the signal in the data communication channel is analyzed to detect communicated data encoded in the obtained signal. For example, the signal includes encoded binary data indicating one or more of the touch input type/property/option and encoded binary data is detected and obtained from the obtained signal.

At 1508, the detected data is provided. In some embodiments, the communicated data is provided to application system 122 of FIG. 1 for use by one or more applications to provide application functionality that is based the detected data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a propagating medium configured to receive a first touch input provided by a touch input indicator device, wherein the touch input indicator device includes a transmitter that transmits a first signal to the propagating medium when the touch input indicator device contacts the propagating medium and the first signal encodes a digital binary data;
a receiver coupled to the propagating medium, wherein the receiver is configured to receive the first signal, from the touch input indicator device, that has been propagated through the propagating medium; and
a fixed transmitter coupled to the propagating medium at a fixed location and the fixed transmitter is configured to transmit a second signal to be propagated through the propagating medium and received at the receiver; and
a processor configured to detect the digital binary data in the received signal and detect based at least in part on the detection of the digital binary data, the first touch input provided by the touch input indicator device, and identify a location of a second touch input provided on the propagating medium at least in part by analyzing a disturbance by the second touch input to the second signal propagated through the propagating medium.

2. The system of claim 1, wherein detecting the digital binary data includes correlating the received propagated signal with a reference signal.

3. The system of claim 1, wherein the propagating medium includes a cover glass of a touch screen.

4. The system of claim 1, wherein the propagating medium is metal or plastic.

5. The system of claim 1, wherein the touch input indicator device is a stylus.

6. The system of claim 1, wherein the receiver is a piezoelectric transducer and the first signal is an ultrasonic signal.

7. The system of claim 1, wherein the digital binary data includes a pseudorandom binary sequence.

8. The system of claim 1, wherein detecting the first touch input includes identifying a location of the first touch input on a surface of the propagating medium based at least in part on a time value associated with a distance traveled by the first signal.

9. The system of claim 1, wherein detecting the first touch input includes identifying a force of the first touch input on a surface of the propagating medium based at least in part on a magnitude of the received propagated signal of the first signal.

10. The system of claim 9, wherein the identified force was determined based at least in part on an orientation angle associated with the first touch input.

11. The system of claim 1, wherein detecting the first touch input includes identifying an orientation angle of the first touch input indicator device when the first touch input was provided based at least in part on a determined distance traveled by the first signal within a tip of the touch input indicator device.

12. The system of claim 11, wherein the processor is further configured to determine the orientation angle corresponding to the distance traveled by the first signal within the tip.

13. The system of claim 1, wherein the receiver is further configured to receive a third signal from a second touch input indicator device that has been propagated through the propagating medium, wherein the third signal encodes a second digital binary data.

14. The system of claim 1, wherein the first signal includes a second communication channel that includes a signal component encoding digital data specifying a type property associated with the first touch input.

15. The system of claim 14, wherein the second communication channel is associated with a second frequency range, a first communication channel includes a primary signal component encoding the digital binary data, and the first communication channel is associated with a first frequency range different from the second frequency range.

16. The system of claim 15, wherein the first frequency range and the second frequency range are both within an ultrasonic frequency range.

17. The system of claim 1, wherein the touch input indicator device identifies a selected touch input option among a plurality of options.

18. A method, comprising:
receiving a first touch input provided by a touch input indicator device on a propagating medium, wherein the touch input indicator device includes a transmitter that transmits a signal to the propagating medium when the touch input indicator device contacts the propagating medium and the signal encodes a digital binary data;
receiving at a receiver the first signal, from the touch input indicator device, that has been propagated through the propagating medium, wherein the receiver is coupled to the propagating medium;
detecting the digital binary data in the received signal;
detecting based at least in part on the detection of the digital binary data, the first touch input provided by the touch input indicator device; and
identifying a location of a second touch input provided on the propagating medium at least in part by analyzing a disturbance by the second touch input to a second signal propagated through the propagating medium, wherein a fixed transmitter is coupled to the propagating medium at a fixed location and the fixed transmitter transmitted the second signal and the receiver received the second signal that has been disturbed by the second touch input.

19. The method of claim 18, wherein the digital binary data includes a pseudorandom binary sequence.

20. A touch input indicator device, comprising:
a transmitter configured to transmit a first signal that encodes a digital binary data; and
a contact tip coupled to the transmitter and configured to contact a propagating medium of a receiving device to propagate the first signal through the propagating medium;
wherein when the receiving device receives the first signal that has been propagated through the propagating medium, the receiving device detects the digital binary data in the received signal and detects based at least in part on the detection of the digital binary data, a first touch input provided by the touch input indicator device, and a fixed transmitter is coupled to the propagating medium at a fixed location, the fixed transmitter is configured to transmit a second signal to be propagated through the propagating medium and received at the receiving device, and the receiving device is configured to identify a location of a second touch input provided on the propagating medium at least in part by analyzing a disturbance by the second touch input to the second signal propagated through the propagating medium.

* * * * *